(12) United States Patent
Terada et al.

(10) Patent No.: US 12,103,511 B2
(45) Date of Patent: Oct. 1, 2024

(54) BRAKE SYSTEM

(71) Applicant: Hitachi Astemo, Ltd., Ibaraki (JP)

(72) Inventors: Eisuke Terada, Hitachinaka (JP);
Yasushi Konishi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 397 days.

(21) Appl. No.: 17/424,051

(22) PCT Filed: Jan. 24, 2020

(86) PCT No.: PCT/JP2020/002440
§ 371 (c)(1),
(2) Date: Jul. 19, 2021

(87) PCT Pub. No.: WO2020/158585
PCT Pub. Date: Aug. 6, 2020

(65) Prior Publication Data
US 2022/0080935 A1 Mar. 17, 2022

(30) Foreign Application Priority Data
Jan. 29, 2019 (JP) .................................. 2019-013054

(51) Int. Cl.
*B60T 13/66* (2006.01)
*B60T 8/88* (2006.01)
(Continued)

(52) U.S. Cl.
CPC ................ *B60T 8/92* (2013.01); *B60T 8/885* (2013.01); *B60T 7/12* (2013.01); *B60T 13/62* (2013.01);
(Continued)

(58) Field of Classification Search
CPC .............. B60T 8/92; B60T 8/885; B60T 7/12; B60T 13/62; B60T 2270/402; B60T 2270/82;
(Continued)

(56) References Cited

U.S. PATENT DOCUMENTS 6,231,133 B1 * 5/2001 Tsukamoto ............... B60T 8/94
303/122.04
2012/0239265 A1 9/2012 Kato et al.
(Continued)

FOREIGN PATENT DOCUMENTS

DE 10 2016 005 318 11/2017
JP 2002-225689 8/2002
(Continued)

OTHER PUBLICATIONS

International Search Report issued Mar. 10, 2020 in corresponding International Application No. PCT/JP2020/002440, with English Translation.
Written Opinion of the International Searching Authority issued Mar. 10, 2020 in corresponding International Application No. PCT/JP2020/002440, with English Translation.
Office Action issued Oct. 18, 2022 in corresponding Japanese Patent Application No. 2020-569571, with English translation.

*Primary Examiner* — Nicholas J Lane
*Assistant Examiner* — Stephen M Bowes
(74) *Attorney, Agent, or Firm* — Wenderoth, Lind & Ponack, L.L.P.

(57) ABSTRACT

Provided is a brake system including a main automatic driving ECU, a main actuator, a sub automatic driving ECU, and a sub actuator. The main actuator is configured to receive a braking request from the main automatic driving ECU or a braking request made through an operation of a brake pedal, and to apply a braking force to a vehicle. The sub actuator is configured to receive a braking request from the sub automatic driving ECU, and to apply a braking force
(Continued)

to the vehicle. When the main automatic driving ECU has failed, the sub automatic driving ECU is configured to acquire the braking request from the main actuator through the sub actuator, and to cause the main actuator to apply the braking force.

5 Claims, 11 Drawing Sheets

(51) Int. Cl.
  *B60T 8/92* (2006.01)
  *B60T 7/12* (2006.01)
  *B60T 13/62* (2006.01)
(52) U.S. Cl.
  CPC ..... *B60T 2270/402* (2013.01); *B60T 2270/82* (2013.01)
(58) Field of Classification Search
  CPC ...... B60T 13/662; B60T 13/686; B60T 7/042; B60T 8/17; B60W 10/18; B60W 2510/18; B60W 2540/12; B60W 2710/18; B60W 60/00; B60W 60/007
  See application file for complete search history.

(56) References Cited

U.S. PATENT DOCUMENTS

| | | | |
|---|---|---|---|
| 2013/0124063 A1* | 5/2013 | Kawakami | B60T 8/4077 701/93 |
| 2014/0005890 A1* | 1/2014 | Tanaka | B60T 8/17552 701/38 |
| 2016/0082937 A1 | 3/2016 | Nakaoka et al. | |
| 2017/0036659 A1 | 2/2017 | Murakami et al. | |
| 2017/0259793 A1 | 9/2017 | Ohmori et al. | |
| 2017/0297546 A1* | 10/2017 | Takeda | B60T 17/18 |
| 2019/0152459 A1 | 5/2019 | Dieckmann et al. | |
| 2019/0210581 A1* | 7/2019 | Saito | B60T 13/686 |
| 2019/0337503 A1* | 11/2019 | Otremba | B60T 13/662 |
| 2020/0086842 A1* | 3/2020 | Schwab | B60T 13/662 |
| 2021/0146900 A1* | 5/2021 | Einig | B60T 13/662 |

FOREIGN PATENT DOCUMENTS

| | | |
|---|---|---|
| JP | 2012-192776 | 10/2012 |
| JP | 2013-71719 | 4/2013 |
| JP | 2016-101892 | 6/2016 |
| WO | 2014/184840 | 11/2014 |

\* cited by examiner

BRAKE SYSTEM

TECHNICAL FIELD

The present invention relates to a brake system configured to apply a braking force to a vehicle, for example, an automobile.

BACKGROUND ART

For example, in Patent Literature 1, there is described a braking control device for a vehicle which is configured to execute, when a braking request of automatic brake and a braking request of a driver are simultaneously generated, control based on a target braking force obtained by adding those braking requests to each other. In Patent Literature 2, there is described a collision avoidance device which is configured to execute, when a braking request of automatic brake and a braking request of a driver are simultaneously generated, control based on a target braking force obtained by selecting a higher one of those braking requests. In Patent Literature 3, there is described a driving assist device for a vehicle which is configured to give, when a braking request of automatic brake and a braking request of a driver are simultaneously generated, priority to the braking request of the driver.

CITATION LIST

Patent Literature

PTL 1: JP 2002-225689 A
PTL 2: JP 2016-101892 A
PTL 3: JP 2012-192776 A

SUMMARY OF INVENTION

Technical Problem

Consideration is now given to automatic driving of a vehicle. In the automatic driving, even when a failure occurs, it is required to continue the automatic driving until a driver resumes driving or the vehicle stops. As a result, it is required to secure redundancy of a system of the automatic brake, and for example, it is conceivable that a sub system is configured to achieve the braking request of the automatic driving when a main system is abnormal. Moreover, even under the abnormal state, it is desired that the same brake performance as that in the normal state be able to be maintained.

Solution to Problem

An object of the present invention is to provide a brake system capable of continuing the same brake performance as that in a normal state even under an abnormal state.

According to one embodiment of the present invention, there is provided a brake system including: a first vehicle control device; a first actuator configured to receive a braking request from the first vehicle control device or a braking request made through an operation of a brake pedal, and to apply a braking force to a vehicle; a second vehicle control device; a second actuator configured to receive a braking request from the second vehicle control device, and to apply a braking force to the vehicle; and an arbitration unit configured to generate a final braking request when the braking request is made through the operation of the brake pedal under a state in which the braking request from the second vehicle control device exists, wherein, when the braking request is made through the operation of the brake pedal under a state in which the first vehicle control device has failed and the braking request from the second vehicle control device exists, the arbitration unit is configured to cause at least one of the first actuator and the second actuator to apply the braking force to the vehicle based on the final braking request generated by acquiring, from the first actuator, the braking request made through the operation of the brake pedal.

Further, according to one embodiment of the present invention, there is provided a brake system including: a first vehicle control device; a first actuator configured to receive a braking request from the first vehicle control device or a braking request made through an operation of a brake pedal, and to apply a braking force to a vehicle; a second vehicle control device; and a second actuator configured to receive a braking request from the second vehicle control device, and to apply a braking force to the vehicle, wherein, when the first vehicle control device has failed, the second vehicle control device is configured to acquire the braking request from the first actuator through the second actuator, and to cause the first actuator to apply the braking force.

Advantageous Effects of Invention

According to one embodiment of the present invention, it is possible to continue the same brake performance as that in the normal state even under the abnormal state.

DESCRIPTION OF EMBODIMENTS

Description is now given of a brake system according to embodiments of the present invention with reference to the accompanying drawings by taking, as an example, a case in which the brake system is mounted to a four-wheel vehicle.

Figure 1:
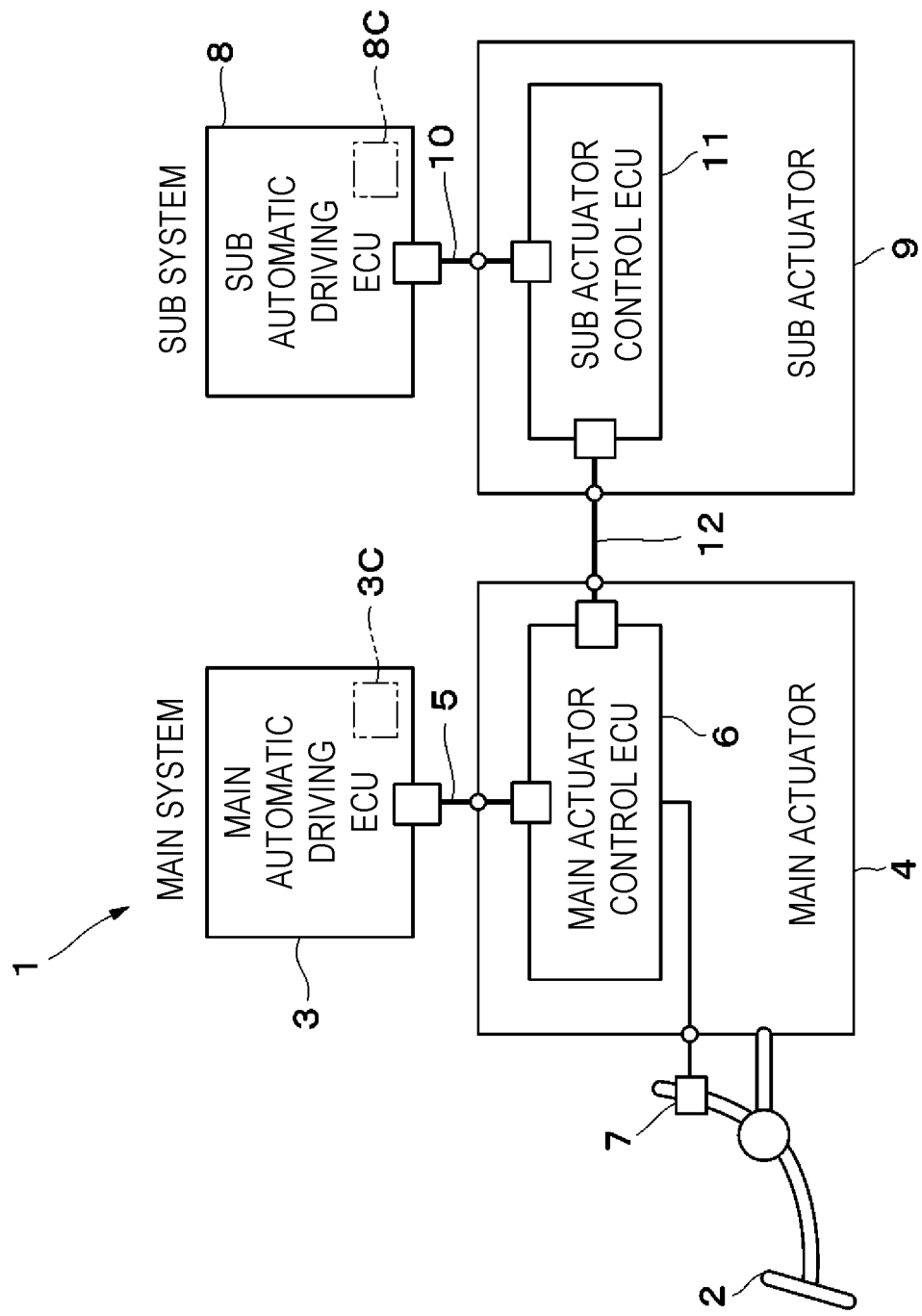
FIG. 1 is a configuration diagram for illustrating an overview of a brake system according to a first embodiment of the present invention.

FIG. 1 to FIG. 5 are illustrations of a first embodiment of the present invention. In FIG. 1, to a vehicle being an automobile, a brake system 1 configured to apply a braking force to the vehicle is mounted. The brake system 1 applies the braking force to the vehicle based on an operation of a brake pedal 2 by a driver. Moreover, the brake system 1 forms a brake system (automatic brake system) of an automatic driving system configured to cause the vehicle to automatically travel without requiring driving operations (acceleration operation, deceleration operation, and steering operation) of the driver. The automatic driving system includes, for example, the brake system 1 configured to apply the braking force to the vehicle, a steering system (automatic steering system) configured to steer the vehicle, and a driving system (automatic driving system) configured to drive the vehicle. In FIG. 1 to FIG. 5, systems (for example, the steering system and the driving system) relating to the automatic driving other than the brake system 1 are omitted.

The brake system 1 includes a main automatic driving ECU 3 serving as a first vehicle control device, a main actuator 4 serving as a first actuator, a sub automatic driving ECU 8 serving as a second vehicle control device, and a sub actuator 9 serving as a second actuator. Moreover, the brake system 1 includes braking request arbitration control units 3C and 8C serving as arbitration units. The main automatic driving ECU 3 is a control device configured to control the vehicle. That is, the main automatic driving ECU 3 is an electronic control unit (ECU) configured to automatically drive the vehicle, and includes a microcomputer including, for example, an arithmetic circuit (CPU) and a memory.

To the main automatic driving ECU 3, there is connected an external world information detection unit (not shown) configured to detect (recognize) external world information on the vehicle. The external world information detection unit is also referred to as "external world recognition sensor," and forms an object position measurement device configured to measure the position of an object around the vehicle. As the external world information detection unit, for example, a camera (for example, digital camera) such as a stereo camera and a single camera and/or a radar (for example, a light emitting device such as semiconductor laser and a light reception device for receiving the light) such as a laser radar, an infrared radar, and a millimeter wave radar can be used. Moreover, as the external world information detection unit, for example, an ultrasonic sensor and an infrared sensor may be used. That is, the external world information detection unit is not limited to the camera and the radar, and it is possible to use various sensors (a detection device, a measurement device, and an electric wave detector) capable of recognizing (detecting) a state of the external world around the vehicle.

The main automatic driving ECU 3 is connected to various actuators such as the main actuator 4 being the brake actuator, a steering actuator, and a driving actuator (acceleration/deceleration actuator). The main automatic driving ECU 3 is connected to the main actuator 4 through a main communication line 5. The main communication line 5 connects the main automatic driving ECU 3 and the main actuator 4 (main actuator control ECU 6) to each other. The main automatic driving ECU 3 recognizes a state around the vehicle based on information from the external world information detection unit and the like, and extracts an optimal one of a plurality of automatic driving plans including, for example, the travel speed of the vehicle and the trajectory of the vehicle. The main automatic driving ECU 3 outputs commands for achieving the optimal automatic driving plan to automatic driving actuators including the main actuator 4. That is, the main automatic driving ECU 3 transmits the commands for the automatic driving including a braking request to various actuators including, for example, the main actuator 4, the steering actuator, and the driving actuator. As a result, the main automatic driving ECU 3 achieves automatic driving control.

The main actuator 4 being a main brake actuator includes a mechanism configured to operate an electric motor (not shown) in accordance with the main actuator control ECU 6, to thereby generate a braking force in the vehicle. For example, the main actuator 4 is formed of an electric booster device serving as a fluid pressure control device configured to control (adjust) master cylinder pressure being pressure (fluid pressure) of a master cylinder (not shown), to thereby control pressure of fluid (wheel cylinder pressure) to be supplied to wheel cylinders (not shown). The master cylinder is a fluid pressure source configured to generate brake fluid pressure. Each of the wheel cylinders is provided on a wheel side of the vehicle, and applies a braking force based on the supply of the brake fluid pressure. The master cylinder and the wheel cylinders are connected to each other through brake pipelines.

The main actuator 4 includes the main actuator control ECU 6. The main actuator 4 is controlled by the main actuator control ECU 6. That is, the main actuator control ECU 6 is an electronic control unit (ECU) configured to control the main actuator 4, and includes a microcomputer including, for example, an arithmetic circuit (CPU) and a memory, and a motor drive circuit. To the main actuator control ECU 6, a stroke sensor 7 mounted to the brake pedal 2 is connected. The stroke sensor 7 is configured to detect a stroke amount being an operation amount of the brake pedal 2 by the driver, and output a signal corresponding to the stroke amount to the main actuator control ECU 6. A sensor configured to detect the operation amount of the brake pedal 2 is not limited to the stroke sensor 7, and various sensors (operation detection sensors) capable of detecting the operation amount (pressing amount) of the brake pedal 2, such as a force sensor (load sensor) configured to detect a pedal pressing force and an angle sensor configured to detect a rotational angle (tilt) of the brake pedal 2, may be used. Moreover, the operation amount of the brake pedal 2 may be detected by one (one type of) sensor or a plurality of sensors (a plurality of types of sensors).

The main actuator control ECU 6 calculates a braking force requested by the driver based on the input signal (operation signal) from the stroke sensor 7, and controls the main actuator 4 based on a calculation result, to thereby achieve the braking request of the driver. Moreover, the main actuator control ECU 6 receives a braking request of the automatic driving from the main automatic driving ECU 3 through the main communication line 5, and controls the main actuator 4 in accordance with the braking request, to thereby achieve the braking request of the automatic driving. As a result, the main actuator 4 receives the braking request from the main automatic driving ECU 3 or the braking request made through the operation of the brake pedal 2, to thereby apply the braking force to the vehicle.

The sub automatic driving ECU 8 has the same function as that of the main automatic driving ECU 3. When an abnormality occurs in the main automatic driving ECU 3 under the automatic driving state, the sub automatic driving ECU 8 switches the main automatic driving ECU 3 to the sub automatic driving ECU 8, to thereby continue the automatic driving control. The sub automatic driving ECU 8 is, as in the main automatic driving ECU 3, an electronic control unit (ECU) configured to automatically drive the vehicle, and includes a microcomputer including, for example, an arithmetic circuit (CPU) and a memory. The sub automatic driving ECU 8 and the main automatic driving ECU 3 may be connected to each other so as to achieve a direct communication, which is not shown. Moreover, the sub automatic driving ECU 8 and the main automatic driving ECU 3 may be connected to each other so as to achieve indirect communication, for example, through another ECU, a gateway, or the like.

To the sub automatic driving ECU 8, as in the main automatic driving ECU 3, there is connected an external world information detection unit (not shown) also referred to as "external world recognition sensor." This external world information detection unit is, as in the external world information detection unit connected to the main automatic driving ECU 3, configured to recognize (detect) the state of the external world around the vehicle, and is formed of various sensors including, for example, a camera and a radar. In this case, to the sub automatic driving ECU 8, for example, there can be connected a sub external world information detection unit different from the main external world information detection unit connected to the main automatic driving ECU 3. Moreover, a common external world information detection unit may be connected to the main automatic driving ECU 3 and the sub automatic driving ECU 8. For example, the main automatic driving ECU 3 and the sub automatic driving ECU 8 calculate automatic driving commands for the same input. Moreover, for example, when a part of the external world information detection unit has failed, both of the main automatic driving ECU 3 and the sub automatic driving ECU 8 receive a sub sensor value, to thereby calculate the automatic driving commands.

The sub automatic driving ECU 8 is connected to the sub actuator 9 through a sub communication line 10. The sub communication line 10 connects the sub automatic driving ECU 8 and the sub actuator 9 (sub actuator control ECU 11) to each other. The sub automatic driving ECU 8 recognizes the state around the vehicle based on information from the external world information detection unit and the like, and extracts an optimal one of a plurality of automatic driving plans including, for example, the travel speed of the vehicle and the trajectory of the vehicle. The sub automatic driving ECU 8 outputs a command for achieving the optimal automatic driving plan to the automatic driving actuators including the sub actuator 9 when an abnormality occurs in the main automatic driving ECU 3. As a result, even when an abnormality occurs in the main automatic driving ECU 3, the automatic driving control can be continued.

The sub actuator 9 being a sub brake actuator includes a mechanism configured to operate an electric motor (not shown), a control valve, and the like in accordance with the sub actuator control ECU 11, to thereby generate a braking force. For example, the sub actuator 9 is formed of an electronic stability control (ESC) serving as a fluid amount control device configured to control an amount of fluid to be supplied to the wheel cylinders (a fluid amount caused by a pump to flow), to thereby control the wheel cylinder pressure being the pressure (fluid pressure) of the wheel cylinders.

The sub actuator 9 includes the sub actuator control ECU 11. The sub actuator 9 is controlled by the sub actuator control ECU 11. That is, the sub actuator control ECU 11 is an electronic control unit (ECU) configured to control the sub actuator 9, and includes a microcomputer including, for example, an arithmetic circuit (CPU) and a memory, and a motor drive circuit. To the sub actuator control ECU 11, for example, wheel speed sensors (not shown) are connected. The sub actuator control ECU 11 controls the sub actuator 9, for example, based on wheel speeds detected by the wheel speed sensors during the travel of the vehicle, to thereby apply or release a required braking force.

Moreover, the sub actuator control ECU 11 receives, through the brake communication line 12, the braking request of the driver calculated by the main actuator control ECU 6 when the main actuator 4 is abnormal, and controls the sub actuator 9 in accordance with the braking request, to thereby achieve the braking request of the driver. Moreover, the sub actuator control ECU 11 receives a braking request of the automatic driving from the sub automatic driving ECU 8 through the sub communication line 10 when the main actuator 4 is abnormal, and controls the sub actuator 9 in accordance with the braking request, to thereby achieve the braking request of the automatic driving. As a result, the sub actuator 9 receives the braking request from the sub automatic driving ECU 8, to thereby apply a braking force to the vehicle.

Incidentally, in the automatic driving, even when a failure occurs, it is required to continue the automatic driving until the driver resumes the driving or the vehicle stops. Thus, the system for the automatic brake is required to be redundantly configured. Thus, in the embodiments, there are provided a main system (main automatic driving ECU 3 and main actuator 4) and a sub system (sub automatic driving ECU 8 and sub actuator 9).

In this case, for example, it is conceivable that the braking request of the automatic driving and the braking request of the driver made through the brake pedal 2 are achieved by the main system (main automatic driving ECU 3, main actuator 4, and stroke sensor 7) under the normal state, and the sub system (sub automatic driving ECU 8 and sub actuator 9) achieves the braking request of the automatic driving when the main system is abnormal. In this system, for example, it is conceivable that when an abnormality occurs in the main automatic driving ECU 3 or an abnormality occurs in the communication (main communication line 5) between the main automatic driving ECU 3 and the main actuator 4, the braking request of the automatic driving is achieved by the sub actuator 9 and the braking request of the driver is achieved by the main actuator 4.

Moreover, even under such an abnormal state, it is desired that the same brake performance as that in the normal state be able to be maintained. In this case, for example, when the main actuator 4 and the sub actuator 9 are completely the same, it is considered that the same brake performance as that in the normal state can be maintained even under the abnormal state. However, for example, when the brake performance of the sub actuator 9 is lower than the brake performance of the main actuator 4 due to cost, there is a possibility that the automatic brake performance in the abnormal state is lower than the automatic brake performance in the normal state.

Thus, in the first embodiment, even when an abnormality occurs in the main automatic driving ECU 3 or the main communication line 5, as long as the main actuator 4 is normal, communication between the sub automatic driving ECU 8 and the main actuator 4 is achieved through the sub actuator 9, and the braking request (braking force) of the automatic driving is generated in the main actuator 4. As a result, the automatic brake can maintain the same performance as that in the normal state. That is, when the main automatic driving ECU 3 is abnormal or the main communication line 5 is abnormal under the automatic driving state, the main actuator control ECU 6 receives the braking request of the automatic driving from the sub automatic driving ECU 8 through the sub communication line 10, the sub actuator control ECU 11, and the brake communication line 12, and controls the main actuator 4 in accordance with the braking request. In other words, in the first embodiment, the braking force is applied by the main actuator 4 even when the main automatic driving ECU 3 is abnormal or the main communication line 5 is abnormal in the automatic driving state. As a result, for example, even when the brake performance of the sub actuator 9 is lower than the brake performance of the main actuator 4, the braking request of the automatic driving can be achieved at the same performance as that in the normal state when the main automatic driving ECU 3 is abnormal or the main communication line 5 is abnormal under the automatic driving state.

That is, in the first embodiment, there is provided, in the main automatic driving ECU 3, a braking request arbitration control unit 3C configured to generate a final braking request from the braking request of the automatic driving and the braking request of the driver made through the operation of the brake pedal 2. In this case, the braking request arbitration control unit 3C provided in the main automatic driving ECU 3 generates the final braking request when the braking request of the driver is made through the operation of the brake pedal 2 under a state in which the braking request of the automatic driving has been made by (an automatic driving braking request calculation unit 3A of) the main automatic driving ECU 3. Moreover, also in the sub automatic driving ECU 8, there is provided a braking request arbitration control unit 8C configured to generated a final braking request from the braking request of the automatic driving and the braking request of the driver made through the operation of the brake pedal 2. In this case, the braking request arbitration control unit 8C provided in the sub automatic driving ECU 8 generates the final braking request when the braking request of the driver is made through the operation of the brake pedal 2 under the state in which the braking request of the automatic driving has been made by (an automatic driving braking request calculation unit 8A of) the sub automatic driving ECU 8.

Moreover, when the braking request of the driver is made through the operation of the brake pedal 2 under a state in which the main automatic driving ECU 3 has failed and the braking request of the automatic driving has been made by the sub automatic driving ECU 8, the braking request arbitration control unit 8C of the sub automatic driving ECU 8 causes the main actuator 4 to apply the braking force to the vehicle based on the final braking request generated by acquiring the braking request made through the operation of the brake pedal 2 from the main actuator 4. In other words, when the braking request of the driver is made through the operation of the brake pedal 2 under the state in which the main automatic driving ECU 3 has failed and the braking request of the automatic driving has been made by the sub automatic driving ECU 8, the braking request arbitration control unit 8C causes the main actuator 4 to apply the braking force to the vehicle based on the final braking request generated from "the braking request made through the operation of the brake pedal 2 acquired from the main actuator 4" and "the braking request from (the automatic driving braking request calculation unit 8A of) the sub automatic driving ECU 8." That is, when the main automatic driving ECU 3 has failed, the sub automatic driving ECU 8 acquires the braking request from the main actuator 4 through the sub actuator 9 (sub actuator control ECU 11), and causes the main actuator 4 to apply the braking force.

Figure 2:
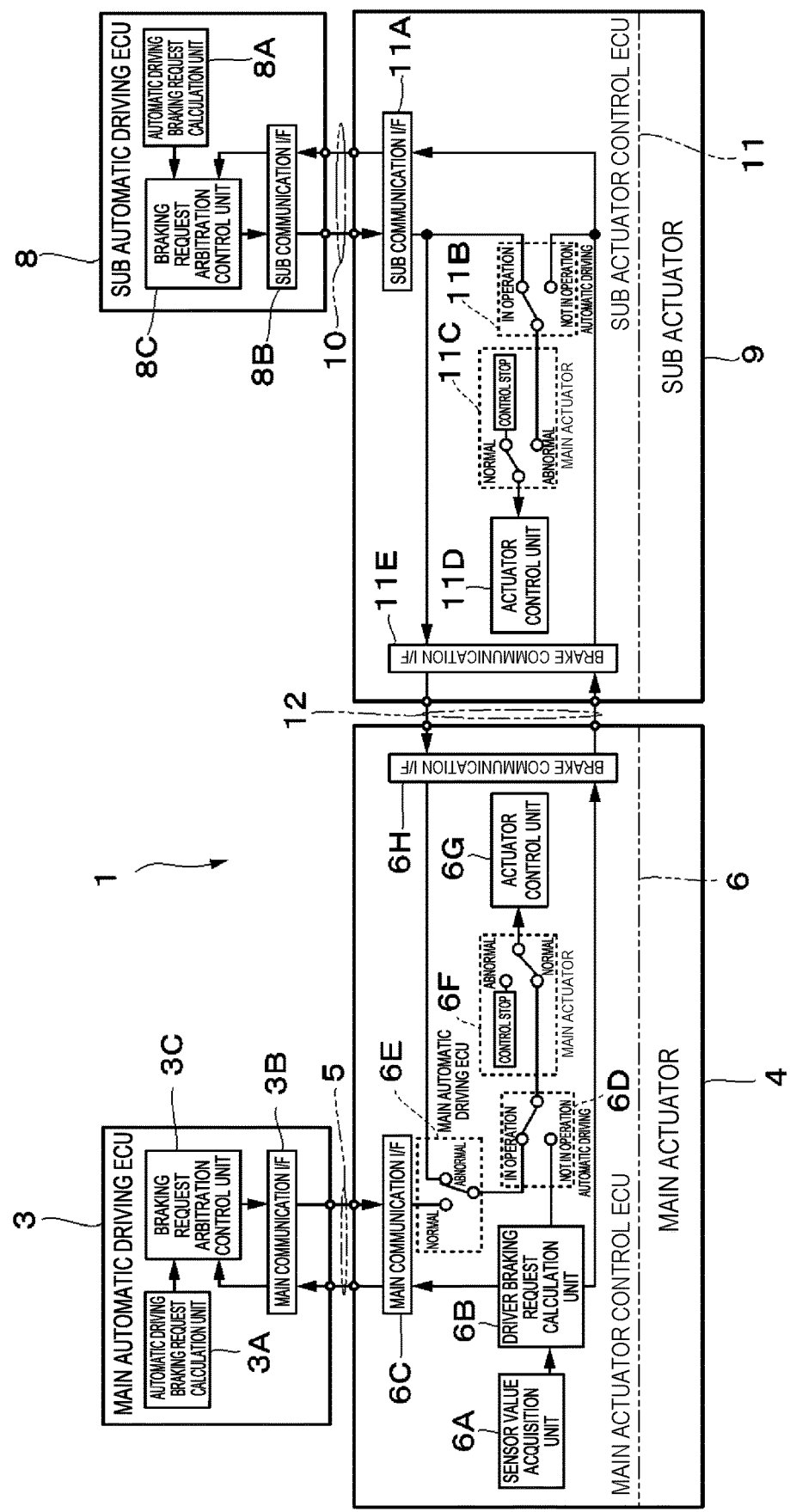
FIG. 2 is a control block diagram for illustrating the brake system according to the first embodiment.

FIG. 2 is a control block diagram for illustrating the brake system according to the first embodiment. The main automatic driving ECU 3 includes the automatic driving braking request calculation unit 3A, a main communication interface 3B (hereinafter referred to as "main communication I/F 3B"), and the braking request arbitration control unit 3C.

An input side of the automatic driving braking request calculation unit 3A is connected to the external world information detection unit, and an output side thereof is connected to the braking request arbitration control unit 3C. The automatic driving braking request calculation unit 3A calculates the braking request being a braking command of the automatic driving based on information from the external world information detection unit and the like. The automatic driving braking request calculation unit 3A outputs the calculated braking request to the braking request arbitration control unit 3C.

The main communication I/F 3B is a communication interface of the main automatic driving ECU 3. The main communication I/F 3B is connected to a main communication interface 6C (hereinafter referred to as "main communication I/F 6C") of the main actuator 4 (main actuator control ECU 6) through the main communication line 5. As a result, the main automatic driving ECU 3 is connected to the main actuator 4 (main actuator control ECU 6) through the main communication line 5. That is, the main automatic driving ECU 3 and the main actuator 4 (main actuator control ECU 6) can mutually communicate to/from each other through the main communication line 5.

An input side of the braking request arbitration control unit 3C is connected to the automatic driving braking request calculation unit 3A. Moreover, the input side of the braking request arbitration control unit 3C is connected to a driver braking request calculation unit 6B of the main actuator 4 (main actuator control ECU 6) through the main communication I/F 6C, the main communication line 5, and the main communication I/F 3B. An output side of the braking request arbitration control unit 3C is connected to a main automatic driving ECU determination unit 6E of the main actuator 4 (main actuator control ECU 6) through the main communication I/F 3B, the main communication line 5, and the main communication I/F 6C.

Figure 5:
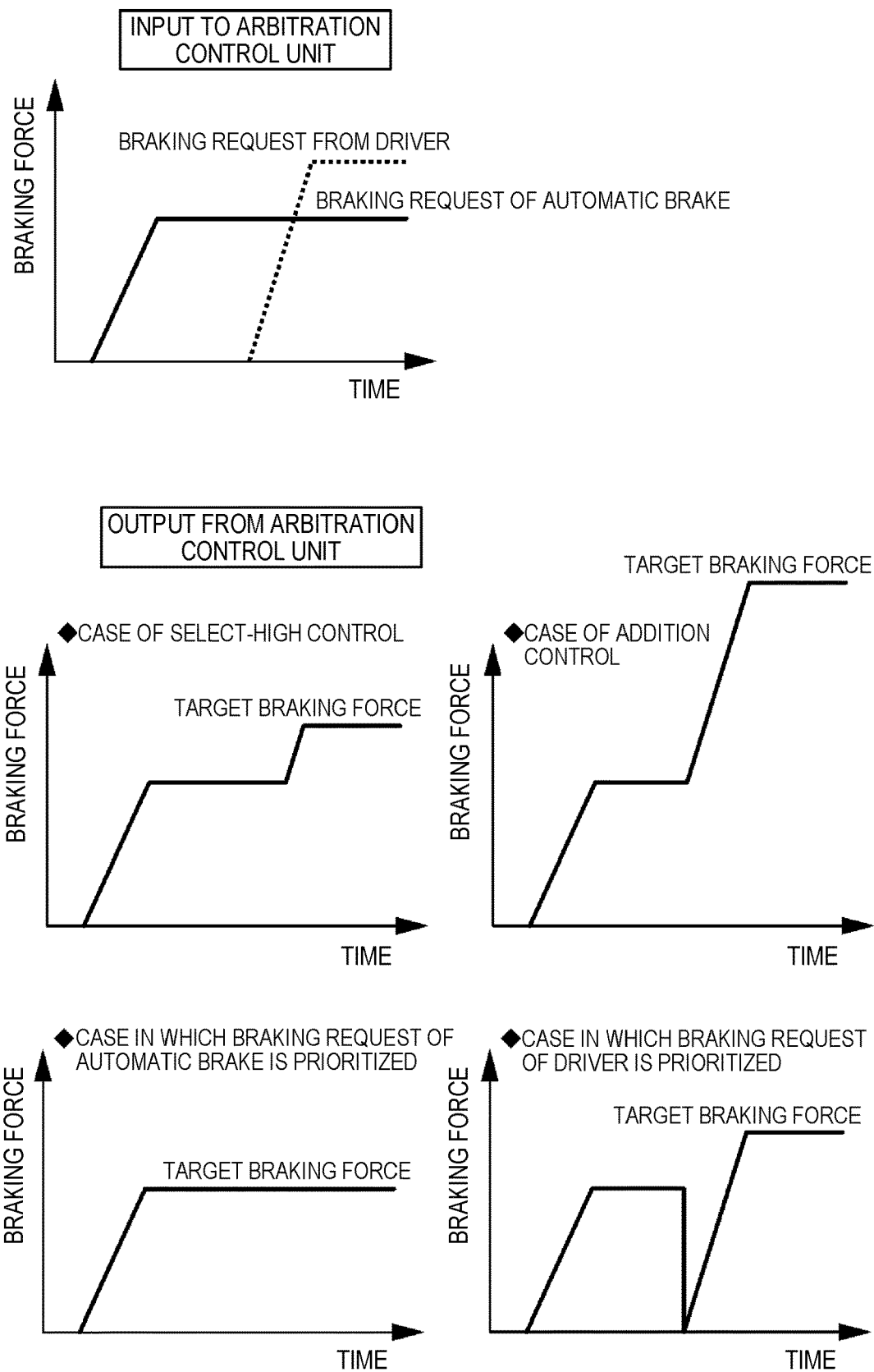
FIG. 5 shows graphs for showing characteristic lines of temporal changes representing four examples (select-high, addition, automatic-brake-prioritized, and driver-prioritized) of a relationship between a braking request input to an arbitration control unit and a target braking force output from the arbitration control unit.

The braking request arbitration control unit 3C generates (calculates) the final braking request from "the braking request of the automatic driving input from the automatic driving braking request calculation unit 3A" and "the braking request of the driver input from the driver braking request calculation unit 6B of the main actuator control ECU 6." For example, as shown in FIG. 5, the braking request arbitration control unit 3C arbitrates between (adjusts) the braking request of the automatic driving (automatic brake braking request) and the braking request of the driver (braking request from the driver) to generate one braking request (target braking force), and outputs the one braking request (target braking force). Control for the arbitration includes a plurality of types of control such as select-high control, addition control, automatic-brake-prioritized control, and driver-prioritized control, and the control may be fixed to any one type of control, or may be switched based on a travel scene (any control may be selected from the plurality of types of control based on the travel scene). The braking request arbitration control unit 3C outputs the final braking request (target braking force) to the main actuator control ECU 6 (main automatic driving ECU determination unit 6E).

Next, the main actuator control ECU 6 includes a sensor value acquisition unit 6A, the driver braking request calculation unit 6B, the main communication I/F 6C, an automatic driving determination unit 6D, the main automatic driving ECU determination unit 6E, a main actuator determination unit 6F, an actuator control unit 6G, and a brake communication interface 6H (hereinafter referred to as "brake communication I/F 6H").

An input side of the sensor value acquisition unit 6A is connected to the stroke sensor 7, and an output side thereof is connected to the driver braking request calculation unit 6B. The sensor value acquisition unit 6A outputs a stroke signal (detection signal) from the stroke sensor 7 to the driver braking request calculation unit 6B as a signal (driver operation signal) corresponding to the operation amount of the brake pedal 2 by the driver.

An input side of the driver braking request calculation unit 6B is connected to the sensor value acquisition unit 6A. An output side of the driver braking request calculation unit 6B is connected to the braking request arbitration control unit 3C of the main automatic driving ECU 3 through the main communication I/F 6C, the main communication line 5, and the main communication I/F 3B. Moreover, the output side of the driver braking request calculation unit 6B is connected to the braking request arbitration control unit 8C of the sub automatic driving ECU 8 through the brake communication I/F 6H, the brake communication line 12, a brake communication interface 11E (hereinafter referred to as "brake communication I/F 11E") and a sub communication interface 11A (hereinafter referred to as "sub communication I/F 11A") of the sub actuator 9 (sub actuator control ECU 11), the sub communication line 10, and a sub communication interface 8B (hereinafter referred to as "sub communication I/F 8B") of the sub automatic driving ECU 8. Further, the output side of the driver braking request calculation unit 6B is connected to an automatic driving determination unit 11B of the sub actuator 9 (sub actuator control ECU 11) through the brake communication I/F 6H, the brake communication line 12, and the brake communication I/F 11E.

The driver braking request calculation unit 6B calculates the braking request of the driver, that is, the braking request made through the operation of the brake pedal 2, based on the signal (driver operation signal) from the sensor value acquisition unit 6A. The braking request of the driver calculated by the driver braking request calculation unit 6B is output to both of the braking request arbitration control unit 3C of the main automatic driving ECU 3 and the braking request arbitration control unit 8C of the sub automatic driving ECU 8. That is, the braking request of the driver is input not only to the braking request arbitration control unit 3C of the main automatic driving ECU 3, but also to the braking request arbitration control unit 8C of the sub automatic driving ECU 8. In this case, the braking request of the driver is input to the braking request arbitration control unit 8C of the sub automatic driving ECU 8 through the sub actuator 9 (sub actuator control ECU 11). That is, the braking request of the driver is input from the main actuator 4 (main actuator control ECU 6) to the sub automatic driving ECU 8 (braking request arbitration control unit 8C) through the brake communication line 12, the sub actuator 9 (sub actuator control ECU 11), and the sub communication line 10.

The main communication I/F 6C is a communication interface of the main actuator 4 (main actuator control ECU 6). The main communication I/F 6C is connected to the main communication interface 3B of the main automatic driving ECU 3 through the main communication line 5. As a result, the main actuator 4 (main actuator control ECU 6) is connected to the main automatic driving ECU 3 through the main communication line 5.

An input side of the automatic driving determination unit 6D is connected to the driver braking request calculation unit 6B. Moreover, the input side of the automatic driving determination unit 6D is connected to the main automatic driving ECU determination unit 6E. An output side of the automatic driving determination unit 6D is connected to the main actuator determination unit 6F. The automatic driving determination unit 6D determines whether the vehicle is in the automatic driving state (automatic driving is in operation) or not (automatic driving is not in operation). When the automatic driving determination unit 6D determines that the vehicle is in the automatic driving state (automatic driving is in operation), the automatic driving determination unit 6D connects the main automatic driving ECU determination unit 6E and the main actuator determination unit 6F to each other. When the automatic driving determination unit 6D determines that the vehicle is not in the automatic driving state (automatic driving is not in operation), the automatic driving determination unit 6D connects the driver braking request calculation unit 6B and the main actuator determination unit 6F to each other.

An input side of the main automatic driving ECU determination unit 6E is connected to the braking request arbitration control unit 3C of the main automatic driving ECU 3 through the main communication I/F 3B, the main communication line 5, and the main communication I/F 6C. Moreover, the input side of the main automatic driving ECU determination unit 6E is connected to the braking request arbitration control unit 8C of the sub automatic driving ECU 8 through the sub communication I/F 8B, the sub communication line 10, the sub communication I/F 11A, the brake communication I/F 11E, the brake communication line 12, and the brake communication I/F 6H. An output side of the main automatic driving ECU determination unit 6E is connected to the automatic driving determination unit 6D. The main automatic driving ECU determination unit 6E determines whether the main automatic driving ECU 3 (and the main communication line 5) is normal or not (abnormal). When the main automatic driving ECU determination unit 6E determines that the main automatic driving ECU 3 (and the main communication line 5) is normal, the main automatic driving ECU determination unit 6E connects the braking request arbitration control unit 3C of the main automatic driving ECU 3 and the automatic driving determination unit 6D to each other. When the main automatic driving ECU determination unit 6E determines that the main automatic driving ECU 3 (or the main communication line 5) is not normal (abnormal), the main automatic driving ECU determination unit 6E connects the braking request arbitration control unit 8C of the sub automatic driving ECU 8 and the automatic driving determination unit 6D to each other.

An input side of the main actuator determination unit 6F is connected to the automatic driving determination unit 6D, and an output side thereof is connected to the actuator control unit 6G. The main actuator determination unit 6F determines whether the main actuator 4 is normal or not (abnormal). When the main actuator determination unit 6F determines that the main actuator 4 is normal, the main actuator determination unit 6F connects the automatic driving determination unit 6D and the actuator control unit 6G to each other. In this case, the braking request can be input to the actuator control unit 6G through the main actuator determination unit 6F, and the braking force can be applied to the vehicle by the main actuator 4. Meanwhile, when the main actuator determination unit 6F determines that the main actuator 4 is not normal (abnormal), the main actuator determination unit 6F disconnects the automatic driving determination unit 6D and the actuator control unit 6G from each other, and connects a control stop unit and the actuator control unit 6G to each other. In this case, the braking request is not input to the actuator control unit 6G, and the main actuator 4 stops.

The actuator control unit 6G is connected to the main actuator determination unit 6F. The actuator control unit 6G controls (drives) the main actuator 4, to thereby apply the braking force to the vehicle, based on any one of the braking request from the driver braking request calculation unit 6B, the braking request from the braking request arbitration control unit 3C of the main automatic driving ECU 3, and the braking request from the braking request arbitration control unit 8C of the sub automatic driving ECU 8. When the actuator control unit 6G is connected to the control stop unit of the main actuator determination unit 6F, the actuator control unit 6G stops the control (drive) of the main actuator 4. Meanwhile, when the actuator control unit 6G is connected to the automatic driving determination unit 6D through the main actuator determination unit 6F, the actuator control unit 6G controls (drives) the main actuator 4 based on the braking request input to the actuator control unit 6G.

The brake communication I/F 6H is a communication interface different from the main communication I/F 6C. The brake communication I/F 6H is connected to the brake communication I/F 11E of the sub actuator 9 (sub actuator control ECU 11) through the brake communication line 12. As a result, the main actuator 4 (main actuator control ECU 6) is connected to the sub actuator 9 (sub actuator control ECU 11) through the brake communication line 12. That is, the main actuator 4 (main actuator control ECU 6) and the sub actuator 9 (sub actuator control ECU 11) can communicate to/from each other through the brake communication line 12.

Next, the sub automatic driving ECU 8 includes an automatic driving braking request calculation unit 8A, the sub communication I/F 8B, and the braking request arbitration control unit 8C.

An input side of the automatic driving braking request calculation unit 8A is connected to the external world information detection unit, and an output side thereof is connected to the braking request arbitration control unit 8C. The automatic driving braking request calculation unit 8A calculates a braking request being a braking command for the automatic driving based on information from, for example, the external world information detection unit, as in the automatic driving braking request calculation unit 3A of the main automatic driving ECU 3. The automatic driving braking request calculation unit 8A outputs the calculated braking request to the braking request arbitration control unit 8C.

The sub communication I/F 8B is a communication interface of the sub automatic driving ECU 8. The sub communication I/F 8B is connected to the sub communication I/F 11A of the sub actuator 9 (sub actuator control ECU 11) through the sub communication line 10. As a result, the sub automatic driving ECU 8 is connected to the sub actuator 9 (sub actuator control ECU 11) through the sub communication line 10. That is, the sub automatic driving ECU 8 and the sub actuator 9 (sub actuator control ECU 11) can communicate to/from each other through the sub communication line 10.

An input side of the braking request arbitration control unit 8C is connected to the automatic driving braking request calculation unit 8A. Moreover, the input side of the braking request arbitration control unit 8C is connected to the driver braking request calculation unit 6B of the main actuator 4 (main actuator control ECU 6) through the brake communication I/F 6H, the brake communication line 12, the brake communication I/F 11E and the sub communication I/F 11A of the sub actuator 9 (sub actuator control ECU 11), the sub communication line 10, and the sub communication I/F 8B. An output side of the braking request arbitration control unit 8C is connected to the main automatic driving ECU determination unit 6E of the main actuator 4 (main actuator control ECU 6) through the sub communication I/F 8B, the sub communication line 10, the sub communication I/F 11A and the brake communication I/F 11E of the sub actuator 9 (sub actuator control ECU 11), the brake communication line 12, and the brake communication I/F 6H. Moreover, the output side of the braking request arbitration control unit 8C is connected to the automatic driving determination unit 11B of the sub actuator 9 (sub actuator control ECU 11) through the sub communication I/F 8B, the sub communication line 10, and the sub communication I/F 11A.

The braking request arbitration control unit 8C generates (calculates) the final braking request from "the braking request of the automatic driving input from the automatic driving braking request calculation unit 8A" and "the braking request of the driver input from the driver braking request calculation unit 6B of the main actuator control ECU 6." That is, the braking request arbitration control unit 8C arbitrates, as in the braking request arbitration control unit 3C of the main automatic driving ECU 3, between the braking request (automatic brake braking request) of the automatic driving and the braking request of the driver (the braking request from the driver) to generate one final braking request (target braking force), and outputs the one final braking request to the sub actuator control ECU 11 (automatic driving determination unit 11B) or to the main actuator control ECU 6 (main automatic driving ECU determination unit 6E) through the sub actuator 9 (sub actuator control ECU 11) and the brake communication line 12.

Next, the sub actuator control ECU 11 includes the sub communication I/F 11A, the automatic driving determination unit 11B, a main actuator determination unit 11C, an actuator control unit 11D, and the brake communication I/F 11E.

The sub communication I/F 11A is a communication interface for the sub actuator 9 (sub actuator control ECU 11). The sub communication I/F 11A is connected to the sub communication I/F 8B of the sub automatic driving ECU 8 through the sub communication line 10. As a result, the sub actuator 9 (sub actuator control ECU 11) is connected to the sub automatic driving ECU 8 through the sub communication line 10.

An input side of the automatic driving determination unit 11B is connected to the braking request arbitration control unit 8C of the sub automatic driving ECU 8 through the sub communication I/F 8B, the sub communication line 10, and the sub communication I/F 11A. Moreover, the input side of the automatic driving determination unit 11B is connected to the driver braking request calculation unit 6B of the main actuator 4 (main actuator control ECU 6) through the brake communication I/F 6H, the brake communication line 12, and the brake communication I/F 11E. An output side of the automatic driving determination unit 11B is connected to the main actuator determination unit 11C. The automatic driving determination unit 11B determines whether the vehicle is in the automatic driving state (automatic driving is in operation) or not (automatic driving automatic driving is not in operation). When the automatic driving determination unit 11B determines that the vehicle is in the automatic driving state (automatic driving is in operation), the automatic driving determination unit 11B connects the braking request arbitration control unit 8C of the sub automatic driving ECU 8 and the main actuator determination unit 11C to each other. When the automatic driving determination unit 11B determines that the vehicle is not in the automatic driving state (automatic driving is not in operation), the automatic driving determination unit 11B connects the driver braking request calculation unit 6B of the main actuator 4 (main actuator control ECU 6) and the main actuator determination unit 11C to each other.

An input side of the main actuator determination unit 11C is connected to the automatic driving determination unit 11B, and an output side thereof is connected to the actuator control unit 11D. The main actuator determination unit 11C determines whether the main actuator 4 is normal or not (abnormal). When the main actuator determination unit 11C determines that the main actuator 4 is not normal (abnormal), the main actuator determination unit 11C connects the automatic driving determination unit 11B and the actuator control unit 11D to each other. In this case, the braking request can be input to the actuator control unit 11D through the main actuator determination unit 11C, and the braking force can be applied to the vehicle by the sub actuator 9. Meanwhile, when the main actuator determination unit 11C determines that the main actuator 4 is normal, the main actuator determination unit 11C disconnects the automatic driving determination unit 11B and the actuator control unit 11D from each other, and connects a control stop unit and the actuator control unit 11D to each other. In this case, the braking request is not input to the actuator control unit 11D, and the sub actuator 9 stops.

The actuator control unit 11D is connected to the main actuator determination unit 11C. The actuator control unit 11D controls (drives) the sub actuator 9 based on any one of the braking request from the driver braking request calculation unit 6B of the main actuator 4 (main actuator control ECU 6) and the braking request from the braking request arbitration control unit 8C of the sub automatic driving ECU 8, to thereby apply the braking force to the vehicle. When the actuator control unit 11D is connected to the control stop unit of the main actuator determination unit 11C, the actuator control unit 11D stops the control (drive) of the sub actuator 9. Meanwhile, when the actuator control unit 11D is connected to the automatic driving determination unit 11B through the main actuator determination unit 11C, the actuator control unit 11D controls (drives) the sub actuator 9 based on the braking request input to the actuator control unit 11D.

The brake communication I/F 11E is a communication interface different from the sub communication I/F 11A. The brake communication I/F 11E is connected to the brake communication I/F 6H of the main actuator 4 (main actuator control ECU 6) through the brake communication line 12. As a result, the sub actuator 9 (sub actuator control ECU 11) is connected to the main actuator 4 (main actuator control ECU 6) through the brake communication line 12.

The brake system for a four-wheel vehicle according to the embodiments has the above-mentioned configuration. Description is now given of the operation thereof.

First, description is given of the application of the braking force based on the operation (manual operation or brake operation) of the driver in the normal state. In this case, the main actuator 4 (main actuator control ECU 6) calculates the braking request (braking request from the driver) in the driver braking request calculation unit 6B based on the value acquired from the sensor value acquisition unit 6A. The calculated driver braking request is input to the actuator control unit 6G of the main actuator control ECU 6. As a result, the actuator control unit 6G operates the main actuator 4, to thereby be capable of applying the braking force based on the brake operation of the driver.

Meanwhile, an abnormality occurs in the main actuator 4, the braking request of the driver calculated by the driver braking request calculation unit 6B of the main actuator control ECU 6 is input to the actuator control unit 11D of the sub actuator control ECU 11 through the brake communication line 12. As a result, the actuator control unit 11D operates the sub actuator 9, to thereby be capable of applying the braking force based on the brake operation of the driver.

Meanwhile, under the automatic driving in the normal state, the main automatic driving ECU 3 arbitrates, in the braking request arbitration control unit 3C, between "the braking request (automatic brake request) from the automatic driving braking request calculation unit 3A" and "the braking request (braking request from the driver) calculated in the driver braking request calculation unit 6B based on the value acquired from the sensor value acquisition unit 6A." As described above, the braking request arbitration control unit 3C of the main automatic driving ECU 3 arbitrates between the two input braking requests (the automatic brake request and the braking request from the driver) to generate the one braking request (target braking force), for example, as shown in FIG. 5, and outputs the one braking request. The control for the arbitration includes a plurality of types of control such as the select-high control, the addition control, the automatic-brake-prioritized control, and the driver-prioritized control, and the control may be fixed to any one type of control, or may be switched based on a travel scene (any control may be selected from the plurality of types of control based on the travel scene). The braking request arbitration control unit 3C arbitrates between the automatic brake request and the braking request from the driver to generate the final braking request, and outputs the final braking request.

Under the normal state, the braking request (final braking request) after the arbitration output from the braking request arbitration control unit 3C of the main automatic driving ECU 3 is input to the actuator control unit 6G of the main actuator control ECU 6 through the main communication line 5. As a result, the main actuator 4 is operated by the actuator control unit 6G, to thereby be capable of achieving the arbitration control. That is, the braking request arbitration control unit 3C can apply, with the use of the main actuator 4 through the actuator control unit 6G, the braking force in accordance with the braking request (final braking request) after the arbitration.

Meanwhile, when an abnormality occurs in the main automatic driving ECU 3 or the main communication line 5, the braking request calculated by the driver braking request calculation unit 6B of the main actuator control ECU 6 is input to the braking request arbitration control unit 8C of the sub automatic driving ECU 8 through the brake communication line 12, the sub actuator control ECU 11, and the sub communication line 10. Moreover, the braking request from the automatic driving braking request calculation unit 8A of the sub automatic driving ECU 8 is also input to the braking request arbitration control unit 8C of the sub automatic driving ECU 8. The braking request arbitration control unit 8C of the sub automatic driving ECU 8 arbitrates between the two braking requests to generate the one braking request (target braking force) as in the braking request arbitration control unit 3C of the main automatic driving ECU 3 (for example, as shown in FIG. 5), and outputs the one braking request. That is, the braking request arbitration control unit 8C arbitrates between the automatic brake request and the braking request from the driver to generate the final braking request, and outputs the final braking request.

The braking request (final braking request) after the arbitration output from the braking request arbitration control unit 8C of the sub automatic driving ECU 8 is input to the actuator control unit 6G of the main actuator control ECU 6 through the sub communication line 10, the sub actuator control ECU 11, and the brake communication line 12. As a result, even when an abnormality occurs, the main actuator 4 is operated by the actuator control unit 6G, to thereby be capable of achieving the arbitration control. That is, when an abnormality occurs in the main automatic driving ECU 3 or the main communication line 5, the braking request arbitration control unit 8C of the sub automatic driving ECU 8 can apply, with the use of the main actuator 4 through the actuator control unit 6G, the braking force in accordance with the braking request (final braking request) after the arbitration.

Figure 3:
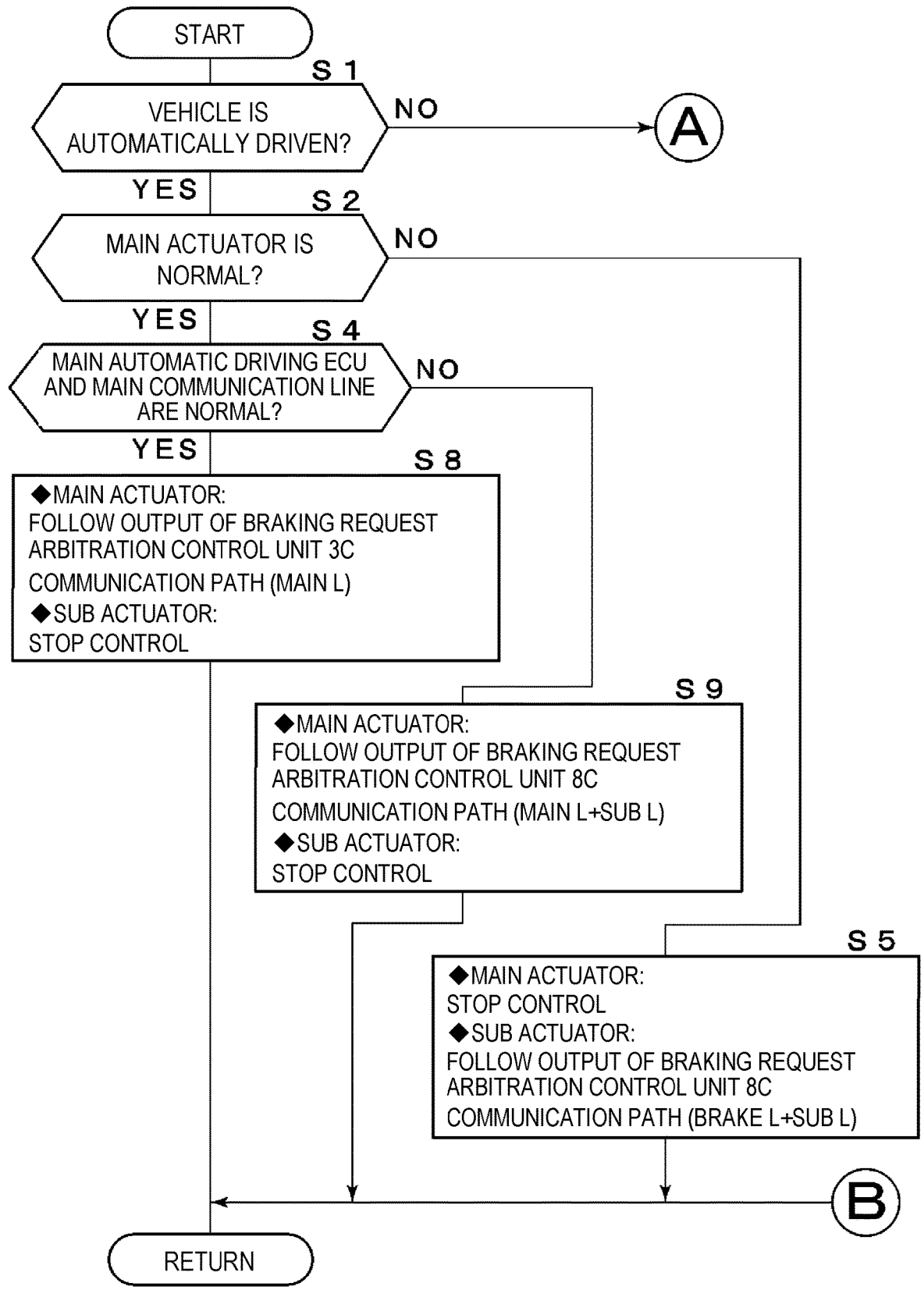
FIG. 3 is a flowchart for illustrating control processing executed by a main actuator control ECU and a sub actuator control ECU.
Figure 4:
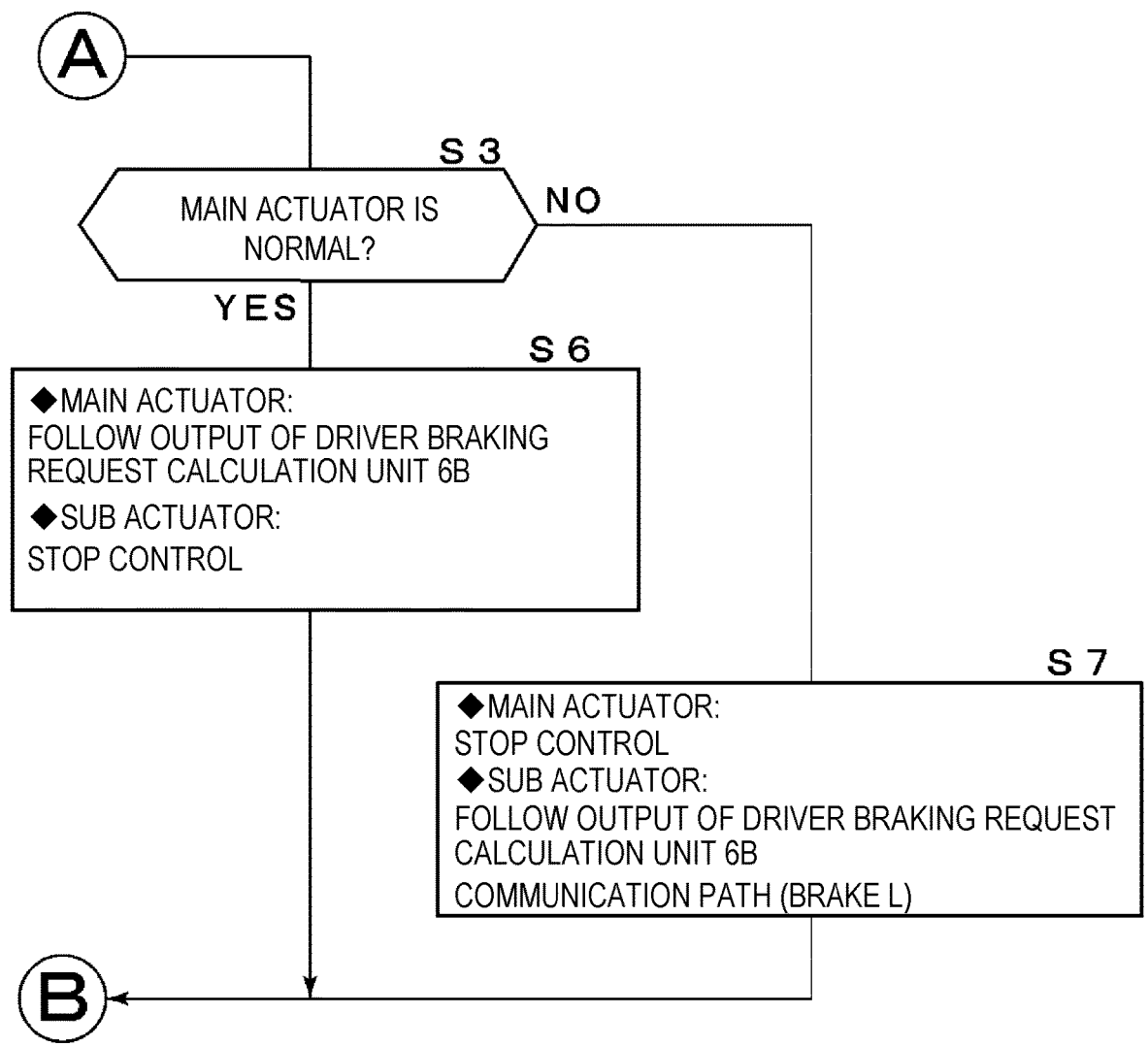
FIG. 4 is a flowchart for illustrating processing continuing from "A" of FIG. 3, FIG. 7, and FIG. 10.

Processing programs for executing a processing flow of FIG. 3 and FIG. 4, that is, processing programs to be used for the arbitration control processing, are stored in the memories of the main actuator control ECU 6 and the sub actuator control ECU 11 in order to execute the arbitration control processing for the braking requests. Thus, with reference to flowcharts of FIG. 3 and FIG. 4, description is given of control processing executed by the main actuator control ECU 6 and the sub actuator control ECU 11. FIG. 4 is a flowchart for illustrating processing continuing from "A" of FIG. 3. Moreover, the control processing of FIG. 3 and FIG. 4 is repeated at a predetermined control cycle (for example, 10 msec).

When the control processing of FIG. 3 starts, in Step S1, the processing program determines whether or not the vehicle is in the automatic driving state. It is possible to determine whether or not the vehicle is in the automatic driving state from, for example, a signal (communication data) output from the main automatic driving ECU 3 or the sub automatic driving ECU 8 and the like. When the processing program makes a determination of "YES" in Step S1, that is, determines that the vehicle is in the automatic driving state, the processing program proceeds to Step S2. Meanwhile, when the processing program makes a determination of "NO" in Step S1, that is, determines that the vehicle is not in the automatic driving state, the processing program proceeds to Step S3 through "A" of FIG. 3 and "A" of FIG. 4. In Step S2, the processing program determines whether or not the main actuator 4 is normal. It is possible to determine whether or not the main actuator 4 is normal from, for example, a result of self-diagnosis processing or a self-check signal. When the processing program makes a determination of "YES" in Step S2, that is, determines that the main actuator 4 is normal, the processing program proceeds to Step S4. Meanwhile, when the processing program makes a determination of "NO" in Step S2, that is, determines that the main actuator 4 is not normal (abnormal), the processing program proceeds to Step S5, and returns. That is, the processing program returns from Step S5 to "START" through "RETURN", and repeats the processing subsequent to Step S1. In Step S3, the processing program determines whether or not the main actuator 4 is normal or not. When the processing program makes a determination of "YES" in Step S3, that is, determines that the main actuator 4 is normal, the processing program proceeds to Step S6, and returns. In this case, the processing program returns through "B" of FIG. 4 and "B" of FIG. 3. Meanwhile. when the processing program makes a determination of "NO" in Step S3, that is, determines that the main actuator 4 is not normal (abnormal), the processing program proceeds to Step S7, and returns. In Step S4, the processing program determines whether or not the main automatic driving ECU 3 and the main communication line 5 are normal. It is possible to determine whether or not the main automatic driving ECU 3 and the main communication line 5 are normal from, for example, a signal (communication data) output from the main automatic driving ECU 3 or based on whether or not this signal exists. When the processing program makes a determination of "YES" in Step S4, that is, determines that the main automatic driving ECU 3 and the main communication line 5 are normal, the processing program proceeds to Step S8, and returns. When the processing program makes a determination of "NO" in Step S4, that is, determines that the main automatic driving ECU 3 or the main communication line 5 is not normal, the processing program proceeds to Step S9, and returns.

Step S5 corresponds to a case in which the vehicle is in the automatic driving state and the main actuator 4 is not normal. In this case, the processing program stops the control of the main actuator 4, and achieves the braking request of the automatic driving with the use of the sub actuator 9. The sub actuator 9 is driven in accordance with the braking request (final braking request) output from the braking request arbitration control unit 8C of the sub automatic driving ECU 8. In this case, the driver braking request calculation unit 6B of the main actuator 4 (main actuator control ECU 6) and the braking request arbitration control unit 8C of the sub automatic driving ECU 8 are connected to each other through the brake communication I/F 6H, the brake communication line 12, the brake communication I/F 11E, the sub communication I/F 11A, the sub communication line 10, and the sub communication I/F 8B. As a result, the signal corresponding to the braking request of the driver output from the driver braking request calculation unit 6B is transmitted from the main actuator 4 (main actuator control ECU 6) to the sub automatic driving ECU 8 through the brake communication line 12, the sub actuator 9 (sub actuator control ECU 11), and the sub communication line 10. Moreover, the braking request arbitration control unit 8C of the sub automatic driving ECU 8 is connected to the actuator control unit 11D through the sub communication I/F 8B, the sub communication line 10, the sub communication I/F 11A, the automatic driving determination unit 11B, and the main actuator determination unit 11C. As a result, a signal corresponding to the final braking request is transmitted from the sub automatic driving ECU 8 to the sub actuator 9 (sub actuator control ECU 11) through the sub communication line 10.

Step S6 corresponds to a case in which the vehicle is not in the automatic driving state and the main actuator 4 is normal. In this case, the processing program stops the control of the sub actuator 9, and achieves the braking request of the driver with the use of the main actuator 4. The main actuator 4 is driven in accordance with the braking request (braking request of the driver) output from the driver braking request calculation unit 6B. In this case, the driver braking request calculation unit 6B is connected to the actuator control unit 6G through the automatic driving determination unit 6D and the main actuator determination unit 6F.

Step S7 corresponds to a case in which the vehicle is not in the automatic driving state and the main actuator 4 is not normal. In this case, the processing program stops the control of the main actuator 4, and achieves the braking request of the driver with the use of the sub actuator 9. The sub actuator 9 is driven in accordance with the braking request (braking request of the driver) output from the driver braking request calculation unit 6B. In this case, the driver braking request calculation unit 6B is connected to the actuator control unit 11D through the brake communication I/F 6H, the brake communication line 12, the brake communication I/F 11E, the automatic driving determination unit 11B, and the main actuator determination unit 11C. As a result, the signal corresponding to the braking request of the driver is transmitted from the main actuator 4 (main actuator control ECU 6) to the sub actuator 9 (sub actuator control ECU 11) through the brake communication line 12.

Step S8 corresponds to a case in which the vehicle is in the automatic driving state, the main actuator 4 is normal, and the main automatic driving ECU 3 and the main communication line 5 are normal. In this case, the processing program stops the control of the sub actuator 9, and achieves the braking request of the automatic driving with the use of the main actuator 4. The main actuator 4 is driven in accordance with the braking request (final braking request) output from the braking request arbitration control unit 3C of the main automatic driving ECU 3. In this case, the driver braking request calculation unit 6B of the main actuator 4 (main actuator control ECU 6) and the braking request arbitration control unit 3C of the main automatic driving ECU 3 are connected to each other through the main communication I/F 6C, the main communication line 5, and the main communication I/F 3B. As a result, the signal corresponding to the braking request of the driver output from the driver braking request calculation unit 6B is transmitted from the main actuator 4 (main actuator control ECU 6) to the main automatic driving ECU 3 through the main communication line 5. Moreover, the braking request arbitration control unit 3C of the main automatic driving ECU 3 is connected to the actuator control unit 6G through the main communication I/F 3B, the main communication line 5, the main communication I/F 6C, the main automatic driving ECU determination unit 6E, the automatic driving determination unit 6D, and the main actuator determination unit 6F. That is, a signal corresponding to the final braking request is transmitted from the main automatic driving ECU 3 to the main actuator 4 (main actuator control ECU 6) through the main communication line 5.

Step S9 corresponds to a case in which the vehicle is in the automatic driving state, the main actuator 4 is normal, and the main automatic driving ECU 3 or the main communication line 5 is not normal. In this case, the processing program stops the control of the sub actuator 9, and achieves the braking request of the automatic driving with the use of the main actuator 4. The main actuator 4 is driven in accordance with the braking request (final braking request) output from the braking request arbitration control unit 8C of the sub automatic driving ECU 8. In this case, the driver braking request calculation unit 6B of the main actuator 4 (main actuator control ECU 6) and the braking request arbitration control unit 8C of the sub automatic driving ECU 8 are connected to each other through the brake communication I/F 6H, the brake communication line 12, the brake communication I/F 11E, the sub communication I/F 11A, the sub communication line 10, and the sub communication I/F 8B. As a result, the signal corresponding to the braking request of the driver output from the driver braking request calculation unit 6B is transmitted from the main actuator 4 (main actuator control ECU 6) to the sub automatic driving ECU 8 through the brake communication line 12, the sub actuator 9 (sub actuator control ECU 11), and the sub communication line 10. Moreover, the braking request arbitration control unit 8C of the sub automatic driving ECU 8 is connected to the actuator control unit 6G through the sub communication I/F 8B, the sub communication line 10, the sub communication I/F 11A, the brake communication I/F 11E, the brake communication line 12, the brake communication I/F 6H, the main automatic driving ECU determination unit 6E, the automatic driving determination unit 6D, and the main actuator determination unit 6F. As a result, the signal corresponding to the final braking request is transmitted from the sub automatic driving ECU 8 to the main actuator 4 (main actuator control ECU 6) through the sub communication line 10, the sub actuator 9 (sub actuator control ECU 11), and the brake communication line 12.

As described above, according to the first embodiment, when the main automatic driving ECU 3 or the main communication line 5 has failed, the braking force can be applied to the vehicle by the main actuator 4 based on the final braking request generated by the braking request arbitration control unit 8C of the sub automatic driving ECU 8. As a result, the same brake performance as that in the normal state can be continued even under the abnormal state (failure state). Moreover, when the main automatic driving ECU 3 or the main communication line 5 has failed, (the braking request arbitration control unit 8C of) the sub automatic driving ECU 8 applies the braking force not with the use of the sub actuator 9, but with the use of the main actuator 4. In this case, (the braking request arbitration control unit 8C of) the sub automatic driving ECU 8 applies the braking force to the vehicle with the use of the main actuator 4 based on the final braking request generated by obtaining the braking request made through the operation of the brake pedal 2 from the main actuator 4 (the driver braking request calculation unit 6B of the main actuator control ECU 6).

That is, (the braking request arbitration control unit 8C of) the sub automatic driving ECU 8 acquires the braking request from the main actuator 4 (the driver braking request calculation unit 6B of the main actuator control ECU 6) through the sub actuator 9 (sub actuator control ECU 11), and applies the braking force through the main actuator 4. As a result, for example, even when the performance of the sub actuator 9 is lowered compared with the performance of the main actuator 4 due to cost, the same brake performance as that in the normal state can be continued under the abnormal state. Moreover, the braking request arbitration control unit 8C is provided not only in the main automatic driving ECU 3, but in the sub automatic driving ECU 8, and hence, when the main automatic driving ECU 3 or the main communication line 5 has failed, the same brake performance as that in the normal state can be continued.

Further, even when the braking request of the automatic driving and the braking request of the driver are simultaneously generated, the braking forces corresponding to the respective braking requests are not independently generated by the actuators 4 and 9. That is, the control can be executed by the only one actuator 4 (9). As a result, it is possible to achieve the control of arbitrating between the two requests as in the normal state.

Figure 6:
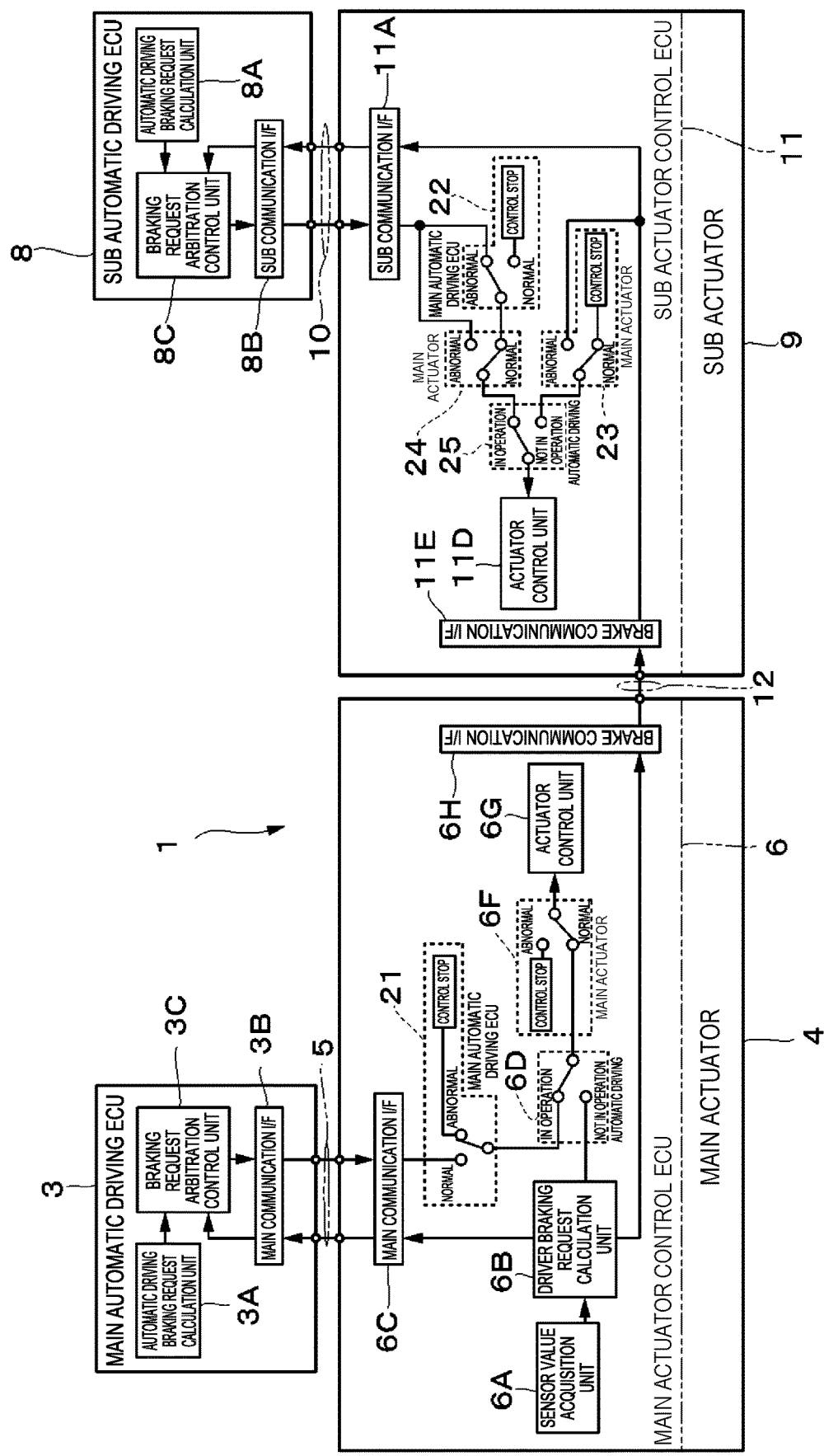
FIG. 6 is a control block diagram for illustrating a brake system according to a second embodiment of the present invention.
Figure 7:
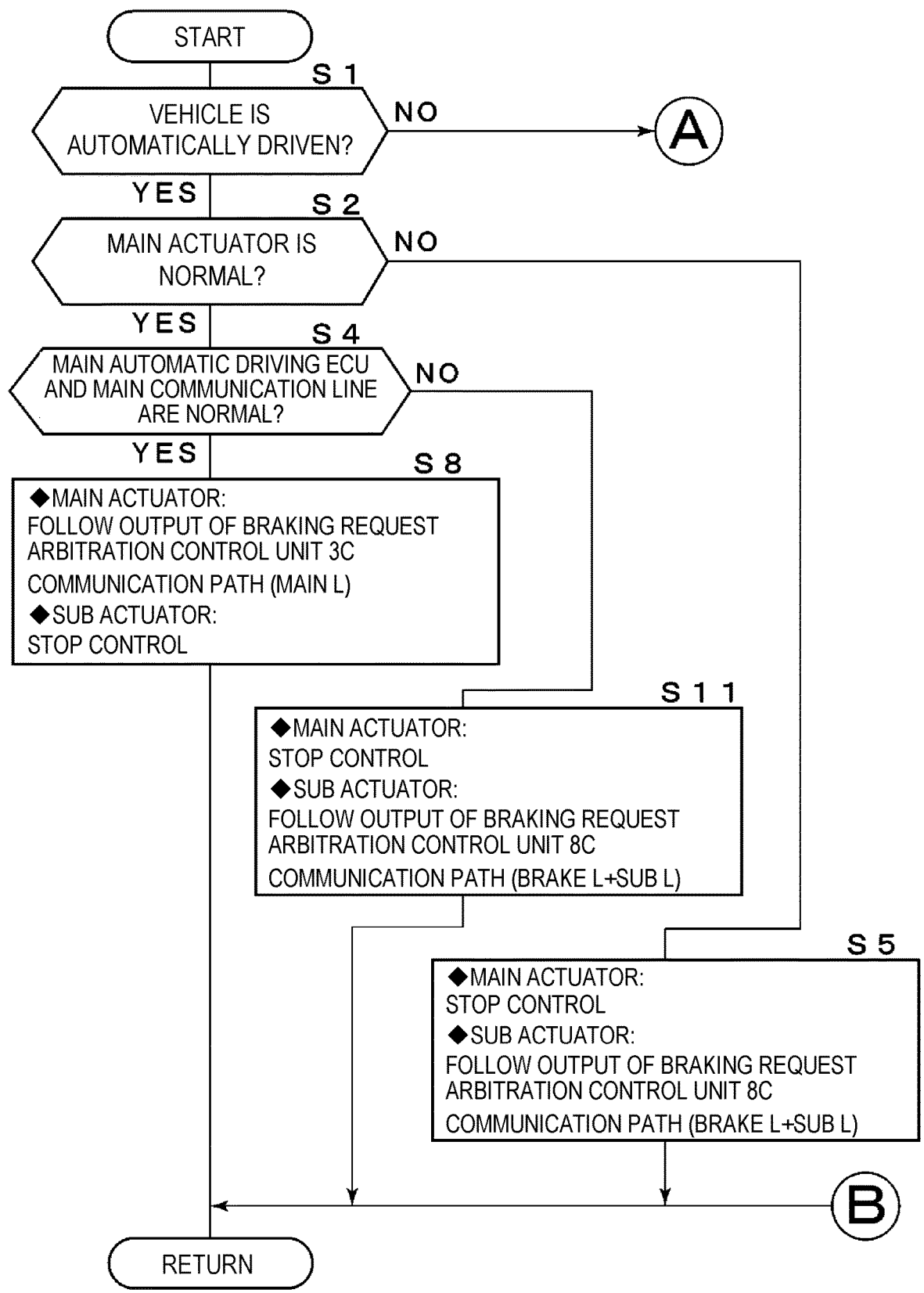
FIG. 7 is a flowchart for illustrating control processing executed by the main actuator control ECU and the sub actuator control ECU.

FIG. 6 and FIG. 7 are illustrations of a second embodiment of the present invention. A feature of the second embodiment resides in that the arbitration unit is configured to apply the braking force to the vehicle with the use of the second actuator when the first vehicle control device has failed. In the second embodiment, the same components as those in the first embodiment are denoted by the same reference symbols, and description thereof is omitted.

In the first embodiment described above, when the main automatic driving ECU 3 or the main communication line 5 has failed under the automatic driving state, the braking force is generated with the use of the main actuator 4. Meanwhile, in the second embodiment, when the main automatic driving ECU 3 or the main communication line 5 has failed under the automatic driving state, the braking force is generated with the use of the sub actuator 9. With this configuration, the automatic driving can be continued while a load on the communication line (brake communication line 12) is suppressed.

FIG. 6 is a control block diagram for illustrating the brake system according to the second embodiment. The main actuator control ECU 6 includes the sensor value acquisition unit 6A, the driver braking request calculation unit 6B, the main communication I/F 6C, the automatic driving determination unit 6D, the main automatic driving ECU determination unit 21, the main actuator determination unit 6F, the actuator control unit 6G, and the brake communication interface 6H. In the second embodiment, the main actuator control ECU 6 (brake communication I/F 6H) and the sub actuator control ECU 11 (brake communication I/F 11E) are connected to each other through the brake communication line 12 for one-way communication. That is, the brake communication line 12 transmits the signal (braking request of the driver) from the main actuator control ECU 6 to the sub actuator control ECU 11.

An input side of the main automatic driving ECU determination unit 21 is connected to the braking request arbitration control unit 3C of the main automatic driving ECU 3 through the main communication I/F 3B, the main communication line 5, and the main communication I/F 6C. An output side of the main automatic driving ECU determination unit 21 is connected to the automatic driving determination unit 6D. The main automatic driving ECU determination unit 21 determines whether the main automatic driving ECU 3 (and the main communication line 5) is normal or not (abnormal). When the main automatic driving ECU determination unit 21 determines that the main automatic driving ECU 3 is normal, the main automatic driving ECU determination unit 21 connects the braking request arbitration control unit 3C of the main automatic driving ECU 3 and the automatic driving determination unit 6D to each other. When the main automatic driving ECU determination unit 21 determines that the main automatic driving ECU 3 is not normal (abnormal), the main automatic driving ECU determination unit 21 disconnects the braking request arbitration control unit 3C and the automatic driving determination unit 6D from each other, and connects the control stop unit and the actuator control unit 6G to each other. In this case, the braking request of the automatic driving is not input to the actuator control unit 6G.

Next, the sub actuator control ECU 11 includes the sub communication I/F 11A, a main automatic driving ECU determination unit 22, a first main actuator determination unit 23, a second main actuator determination unit 24, an automatic driving determination unit 25, the actuator control unit 11D, and the brake communication I/F 11E. An input side of the main automatic driving ECU determination unit 22 is connected to the braking request arbitration control unit 8C of the sub automatic driving ECU 8 through the sub communication I/F 8B, the sub communication line 10, and the sub communication I/F 11A. An output side of the main automatic driving ECU determination unit 22 is connected to the second main actuator determination unit 24. The main automatic driving ECU determination unit 22 determines whether the main automatic driving ECU 3 (and the main communication line 5) is normal or not (abnormal). When the main automatic driving ECU determination unit 22 determines that the main automatic driving ECU 3 is not normal (abnormal), the main automatic driving ECU determination unit 22 connects the braking request arbitration control unit 8C of the sub automatic driving ECU 8 and the second main actuator determination unit 24 to each other. When the main automatic driving ECU determination unit 22 determines that the main automatic driving ECU 3 is normal, the main automatic driving ECU determination unit 22 disconnects the braking request arbitration control unit 8C and the second main actuator determination unit 24 from each other, and connects the control stop unit and the second main actuator determination unit 24 to each other.

An input side of the first main actuator determination unit 23 is connected to the driver braking request calculation unit 6B of the main actuator 4 (main actuator control ECU 6) through the brake communication I/F 6H, the brake communication line 12, and the brake communication I/F 11E. An output side of the first main actuator determination unit 23 is connected to the automatic driving determination unit 25. The first main actuator determination unit 23 determines whether the main actuator 4 is normal or not (abnormal). When the first main actuator determination unit 23 determines that the main actuator 4 is normal, the first main actuator determination unit 23 disconnects the driver braking request calculation unit 6B and the automatic driving determination unit 25 from each other, and connects the control stop unit and the automatic driving determination unit 25 to each other. When the first main actuator determination unit 23 determines that the main actuator 4 is not normal, the first main actuator determination unit 23 connects the driver braking request calculation unit 6B and the automatic driving determination unit 25 to each other.

An input side of the second main actuator determination unit 24 is connected to the braking request arbitration control unit 8C of the sub automatic driving ECU 8 through the sub communication I/F 8B, the sub communication line 10, and the sub communication I/F 11A. Moreover, the input side of the second main actuator determination unit 24 is connected to the main automatic driving ECU determination unit 22. An output side of the second main actuator determination unit 24 is connected to the automatic driving determination unit 25. The second main actuator determination unit 24 determines whether the main actuator 4 is normal or not (abnormal). When the second main actuator determination unit 24 determines that the main actuator 4 is normal, the second main actuator determination unit 24 connects the main automatic driving ECU determination unit 22 and the automatic driving determination unit 25 to each other. When the second main actuator determination unit 24 determines that the main actuator 4 is not normal, the second main actuator determination unit 24 connects the braking request arbitration control unit 8C of the sub automatic driving ECU 8 and the automatic driving determination unit 25 to each other.

An input side of the automatic driving determination unit 25 is connected to the first main actuator determination unit 23. Moreover, the input side of the automatic driving determination unit 25 is connected to the second main actuator determination unit 24. An output side of the automatic driving determination unit 25 is connected to the actuator control unit 11D. The automatic driving determination unit 25 determines whether the vehicle is in the automatic driving state (automatic driving is in operation) or not (automatic driving is not in operation). When the automatic driving determination unit 25 determines that the vehicle is in the automatic driving state (automatic driving is in operation), the automatic driving determination unit 25 connects the second main actuator determination unit 24 and the actuator control unit 11D to each other. When the automatic driving determination unit 25 determines that the vehicle is not in the automatic driving state (automatic driving is not in operation), the automatic driving determination unit 25 connects the first main actuator determination unit 23 and the actuator control unit 11D to each other.

In the second embodiment, when an abnormality occurs in the main automatic driving ECU 3 or the main communication line 5 under the automatic driving state, a request for the control stop is input to the actuator control unit 6G of the main actuator control ECU 6, to thereby stop the control of the main actuator 4. Moreover, the braking request calculated by the driver braking request calculation unit 6B of the main actuator control ECU 6 is input to the braking request arbitration control unit 8C of the sub automatic driving ECU 8 through the brake communication line 12, the sub actuator control ECU 11, and the sub communication line 10. Moreover, the braking request from the automatic driving braking request calculation unit 8A of the sub automatic driving ECU 8 is also input to the braking request arbitration control unit 8C of the sub automatic driving ECU 8. The braking request arbitration control unit 8C arbitrates the two braking requests to generate one braking request (target braking force), and outputs the one braking request. The braking request after the arbitration output from the braking request arbitration control unit 8C of the sub automatic driving ECU 8 is input to the actuator control unit 11D of the sub actuator control ECU 11 through the sub communication line 10. As a result, when an abnormality occurs, the sub actuator 9 is operated by the actuator control unit 11D, to thereby be capable of achieving the arbitration control. That is, when an abnormality occurs in the main automatic driving ECU 3 or the main communication line 5, the braking request arbitration control unit 8C of the sub automatic driving ECU 8 can apply, with the use of the sub actuator 9 through the actuator control unit 11D, the braking force in accordance with the braking request (final braking request) after the arbitration.

Processing programs for executing a processing flow of FIG. 7 and FIG. 4, that is, processing programs to be used for the arbitration control processing, are stored in the memories of the main actuator control ECU 6 and the sub actuator control ECU 11 in order to execute the arbitration control processing for the braking requests. Processing of Steps S1, S2, S4, S5, and S8 of FIG. 7 is the same as the above-mentioned processing of Steps S1, S2, S4, S5, and S8 of FIG. 3, and hence description thereof is omitted.

Step S11 corresponds to a case in which the vehicle is in the automatic driving state, the main actuator 4 is normal, and the main automatic driving ECU 3 and the main communication line 5 are not normal. In this case, the processing program stops the control of the main actuator 4, and achieves the braking request of the automatic driving with the use of the sub actuator 9. The sub actuator 9 is driven in accordance with the braking request (final braking request) output from the braking request arbitration control unit 8C of the sub automatic driving ECU 8. In this case, the driver braking request calculation unit 6B of the main actuator 4 (main actuator control ECU 6) and the braking request arbitration control unit 8C of the sub automatic driving ECU 8 are connected to each other through the brake communication I/F 6H, the brake communication line 12, the brake communication I/F 11E, the sub communication I/F 11A, the sub communication line 10, and the sub communication I/F 8B. As a result, the signal corresponding to the braking request of the driver output from the driver braking request calculation unit 6B is transmitted from the main actuator 4 (main actuator control ECU 6) to the sub automatic driving ECU 8 through the brake communication line 12, the sub actuator 9 (sub actuator control ECU 11), and the sub communication line 10. Moreover, the braking request arbitration control unit 8C of the sub automatic driving ECU 8 is connected to the actuator control unit 11D through the sub communication I/F 8B, the sub communication line 10, the sub communication I/F 11A, the main automatic driving ECU determination unit 22, the second main actuator determination unit 24, and the automatic driving determination unit 25. As a result, the signal corresponding to the final braking request is transmitted from the sub automatic driving ECU 8 to the sub communication line 10 and the sub actuator 9 (sub actuator control ECU 11).

In the second embodiment, the braking force is applied with the use of the above-mentioned main actuator 4 (main actuator control ECU 6) and sub actuator 9 (sub actuator control ECU 11), and a basic action thereof is not particularly different from that in the first embodiment described above. According to the second embodiment, compared with the first embodiment, the automatic driving can be continued while the load on the brake communication line 12 is suppressed.

FIG. 8 to FIG. 11 are illustrations of a third embodiment of the present invention. A feature of the third embodiment is such a configuration that the main communication line and the sub communication line are connected to each other through a gateway. In the third embodiment, the same components as those in the first embodiment are denoted by the same reference symbols, and description thereof is omitted.

In the first embodiment and the second embodiment described above, the main communication line 5 and the sub communication line 10 are configured to be independent of each other so that a failure, for example, disconnection, of one communication line does not cause unavailability of the other communication line. Meanwhile, as in the third embodiment, the main communication line 5 and the sub communication line 10 may be configured to be connected through a gateway 31. Also in this case, it is possible to use the intermediation of the gateway 31 to avoid influence of an abnormality occurring in one communication line on the other communication line. With this configuration, the sub automatic driving ECU 8 can acquire the signal on the main communication line 5, and can thus execute control (for example, sideslip prevention control) of the sub actuator 9 based on the command from the main automatic driving ECU 3 under the normal state.

Figure 8:
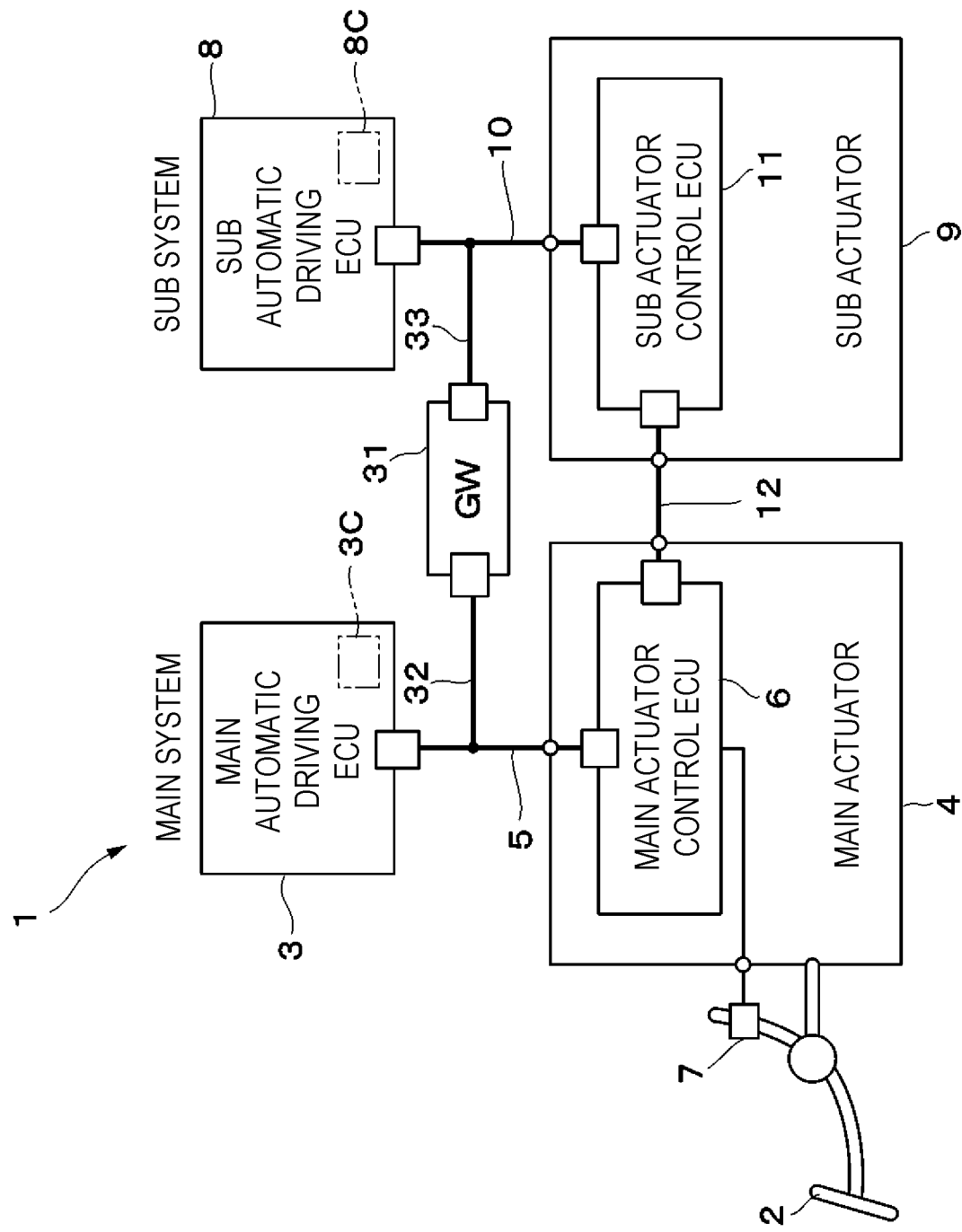
FIG. 8 is a configuration diagram for illustrating an overview of a brake system according to a third embodiment of the present invention.

As illustrated in FIG. 8, the main communication line 5 and the sub communication line 10 are connected to each other through the gateway 31. That is, the main communication line 5 is connected to the gateway 31 through a main side connection line 32, and the sub communication line 10 is connected to the gateway 31 through a sub side connection line 33.

Figure 9:
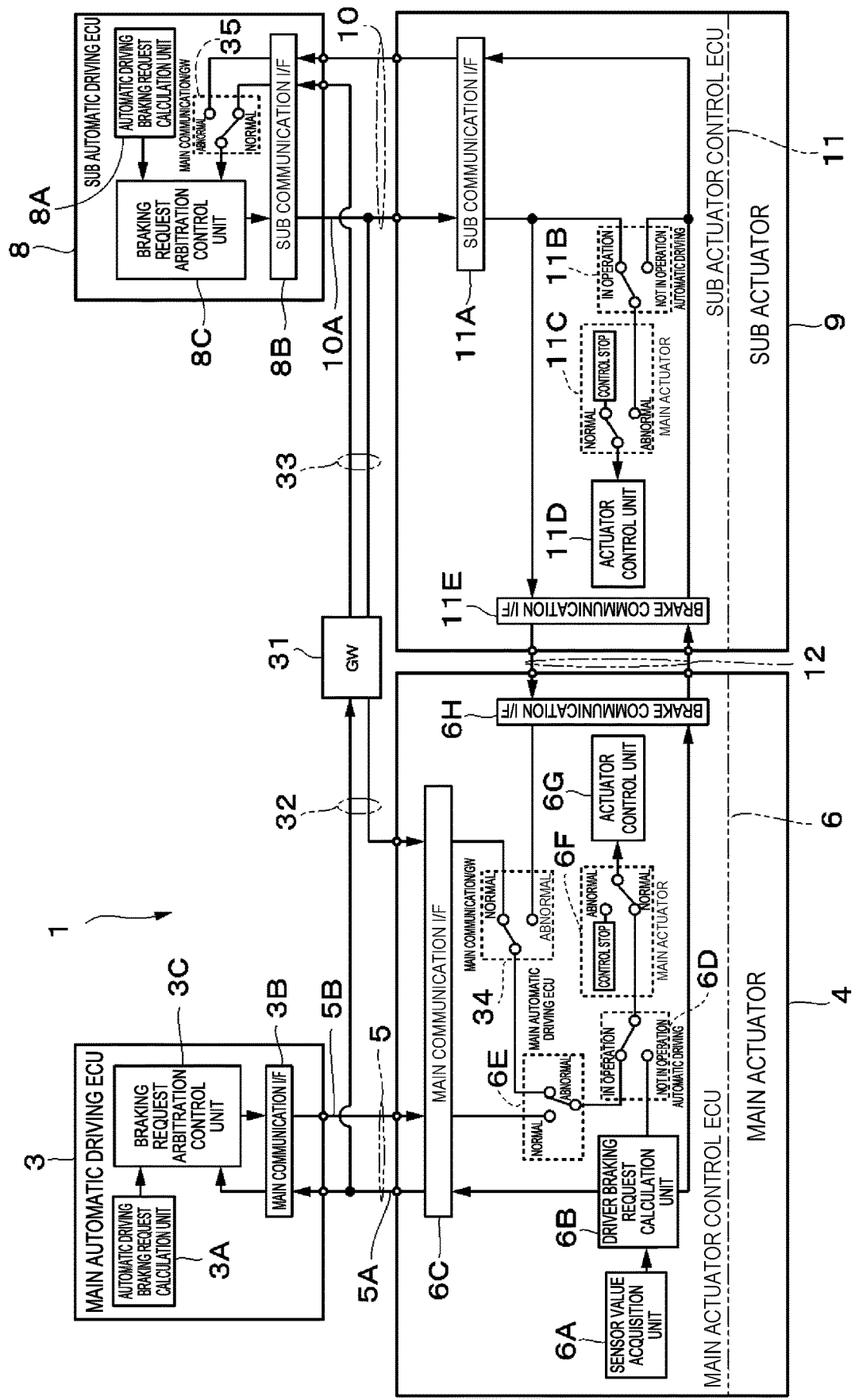
FIG. 9 is a control block diagram for illustrating the brake system according to the third embodiment.

FIG. 9 is a control block diagram for illustrating the brake system according to the third embodiment. The gateway 31 is connected, through the main side connection line 32, to a line 5A, which is a part of the main communication line 5, and inputs the output of the main actuator 4 (main actuator control ECU 6) to the main automatic driving ECU 3. Moreover, the gateway 31 is connected to the main communication I/F 6C of the main actuator 4 (main actuator control ECU 6) through the main side connection line 32. Meanwhile, the gateway 31 is connected to a line 10A, which is a part of the sub communication line 10, and inputs the output of the sub automatic driving ECU 8 to the sub actuator 9 (sub actuator control ECU 11), through sub side connection line 33. Moreover, the gateway 31 is connected to the sub communication I/F 8B of the sub automatic driving ECU 8 through the sub side connection line 33.

The main actuator control ECU 6 includes a main communication/GW determination unit 34 in addition to the sensor value acquisition unit 6A, the driver braking request calculation unit 6B, the main communication I/F 6C, the automatic driving determination unit 6D, the main automatic driving ECU determination unit 6E, the main actuator determination unit 6F, the actuator control unit 6G, and the brake communication I/F 6H.

An input side of the main communication/GW determination unit 34 is connected to the braking request arbitration control unit 8C of the sub automatic driving ECU 8 through the sub communication I/F 8B, the sub communication line 10, the sub side connection line 33, the gateway 31, the main side connection line 32, and the main communication I/F 6C. This path is referred to as "first path". Moreover, the input side of the main communication/GW determination unit 34 is connected to the braking request arbitration control unit 8C of the sub automatic driving ECU 8 through the sub communication I/F 8B, the sub communication line 10, the sub communication I/F 11A, the brake communication I/F 11E, the brake communication line 12, and the brake communication I/F 6H. This path is referred to as "second path". An output side of the main communication/GW determination unit 34 is connected to the main automatic driving ECU determination unit 6E. The main communication/GW determination unit 34 determines whether the main communication line 5 and the gateway 31 are normal or not (abnormal). When the main communication/GW determination unit 34 determines that the main communication line 5 and the gateway 31 are normal, the main communication/GW determination unit 34 connects the braking request arbitration control unit 8C of the sub automatic driving ECU 8 and the main automatic driving ECU determination unit 6E to each other through the first path. When the main communication/GW determination unit 34 determines that the main communication line 5 and the gateway 31 are not normal (abnormal), the main communication/GW determination unit 34 connects the braking request arbitration control unit 8C of the sub automatic driving ECU 8 and the main automatic driving ECU determination unit 6E to each other through the second path.

Moreover, the sub automatic driving ECU 8 includes a main communication/GW determination unit 35 in addition to the automatic driving braking request calculation unit 8A, the sub communication I/F 8B, and the braking request arbitration control unit 8C. An input side of the main communication/GW determination unit 35 is connected to the driver braking request calculation unit 6B of the main actuator 4 (main actuator control ECU 6) through the main communication I/F 6C, the main communication line 5 (5A), the main side connection line 32, the gateway 31, the sub side connection line 33, the sub communication line 10, and the sub communication I/F 8B. This path is referred to as "third path". Moreover, the input side of the main communication/GW determination unit 35 is connected to the driver braking request calculation unit 6B of the main actuator 4 (main actuator control ECU 6) through the brake communication I/F 6H, the brake communication line 12, the brake communication I/F 11E and the sub communication I/F 11A of the sub actuator 9 (sub actuator control ECU 11), the sub communication line 10, and the sub communication I/F 8B. This path is referred to as "fourth path". An output side of the main communication/GW determination unit 35 is connected to the braking request arbitration control unit 8C. The main communication/GW determination unit 35 determines whether the main communication line 5 and the gateway 31 are normal or not (abnormal). When the main communication/GW determination unit 35 determines that the main communication line 5 and the gateway 31 are normal, the main communication/GW determination unit 35 connects the driver braking request calculation unit 6B of the main actuator 4 (main actuator control ECU 6) and the braking request arbitration control unit 8C of the sub automatic driving ECU 8 to each other through the third path. When the main communication/GW determination unit 35 determines that the main communication line 5 and the gateway 31 are not normal (abnormal), the main communication/GW determination unit 35 connects the driver braking request calculation unit 6B of the main actuator 4 (main actuator control ECU 6) and the braking request arbitration control unit 8C of the sub automatic driving ECU 8 to each other through the fourth path.

In the third embodiment, the braking request calculated by the driver braking request calculation unit 6B of the main actuator control ECU 6 is input to the braking request arbitration control unit 8C of the sub automatic driving ECU 8 through the main communication line 5 (line 5A), the gateway 31, and the sub communication line 10 (sub side connection line 33). Moreover, the braking request from the automatic driving braking request calculation unit 8A of the sub automatic driving ECU 8 is also input to the braking request arbitration control unit 8C of the sub automatic driving ECU 8. The braking request arbitration control unit 8C arbitrates the two braking requests to generate the one braking request (target braking force), and outputs the one braking request. The braking request after the arbitration output from the braking request arbitration control unit 8C of the sub automatic driving ECU 8 is input to the actuator control unit 6G of the main actuator control ECU 6 through the sub communication line 10 (sub side connection line 33), the gateway 31, and the main communication line 5 (main side connection line 32). As a result, the main actuator 4 is operated by the actuator control unit 6G, to thereby be capable of achieving the arbitration control.

In the third embodiment, when an abnormality occurs in the main automatic driving ECU 3 or the main communication line 5 (more specifically, the line 5B, which inputs the output of the main automatic driving ECU 3 to the main actuator control ECU 6) under the automatic driving state, the braking request calculated by the driver braking request calculation unit 6B of the main actuator control ECU 6 and the braking request after the arbitration output from the braking request arbitration control unit 8C of the sub automatic driving ECU 8 can be output to the external ECU not through the sub actuator control ECU 11, but through the gateway 31. That is, the braking request calculated by the driver braking request calculation unit 6B of the main actuator control ECU 6 can be output not to the sub actuator control ECU 11, but to the sub automatic driving ECU 8 through the gateway 31. Moreover, the braking request after the arbitration output from the braking request arbitration control unit 8C of the sub automatic driving ECU 8 can be output to the main actuator control ECU 6 not through the sub actuator control ECU 11, but through the gateway 31.

Figure 10:
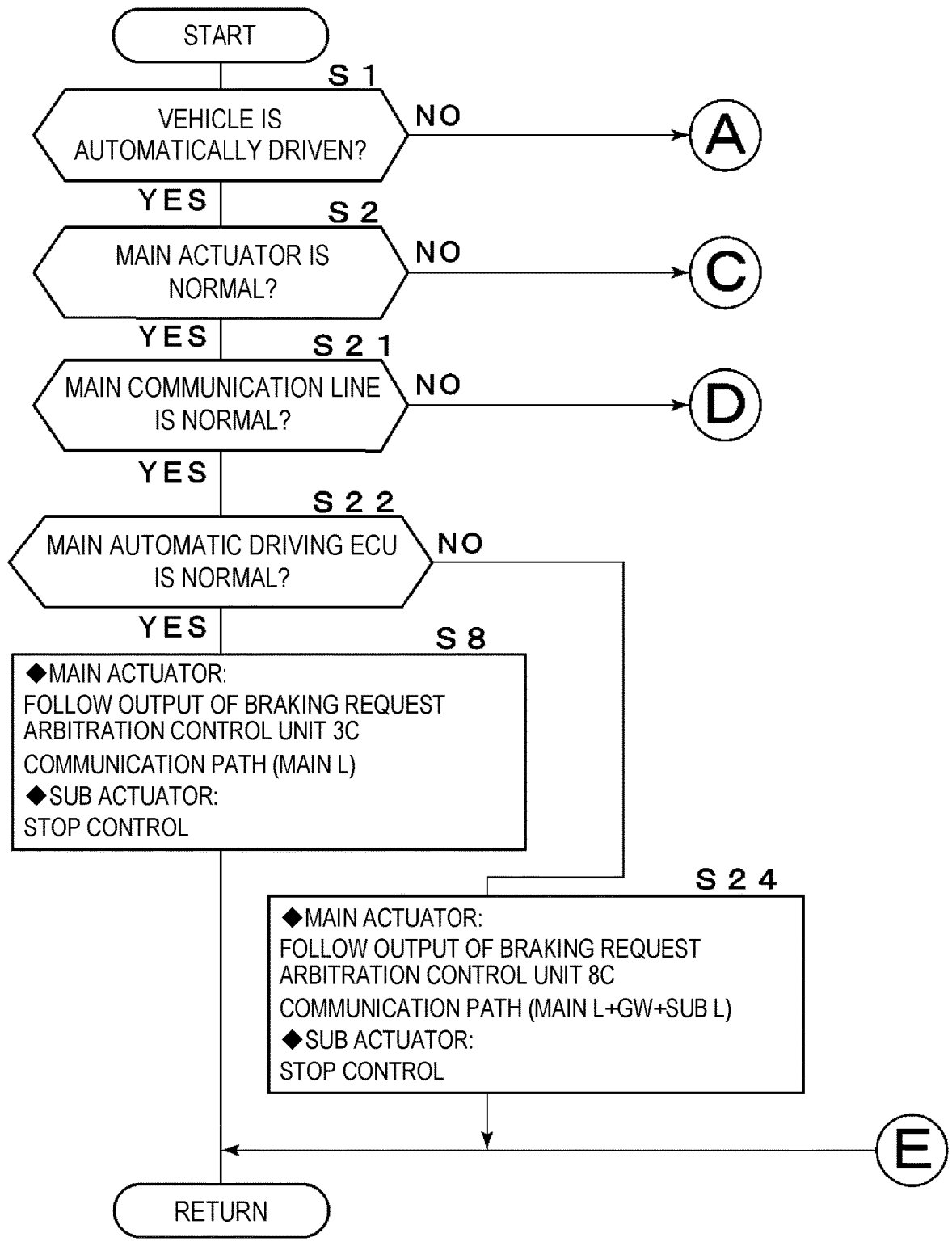
FIG. 10 is a flowchart for illustrating control processing executed by the main actuator control ECU and the sub actuator control ECU.
Figure 11:
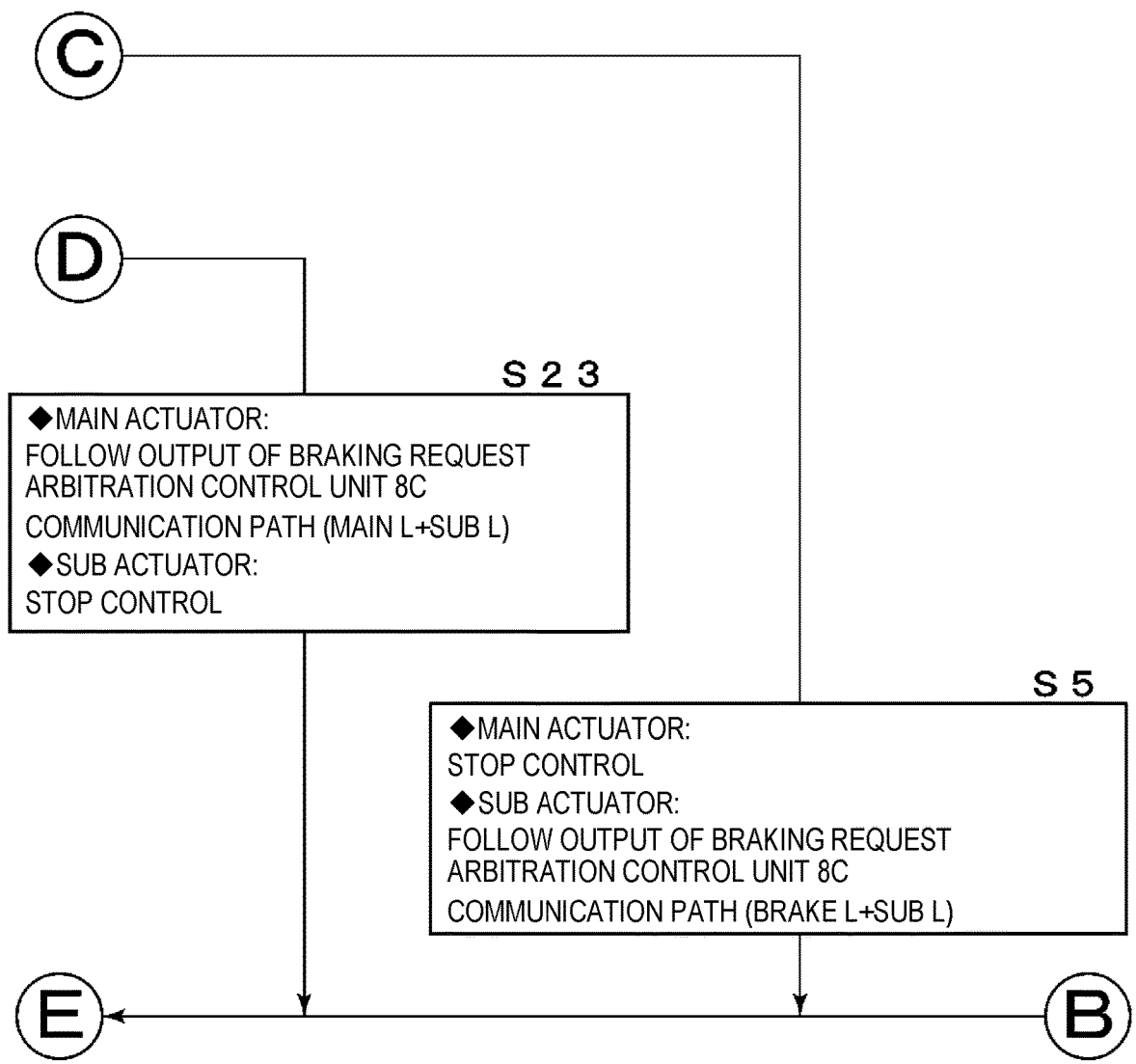
FIG. 11 is a flowchart for illustrating processing continuing from "C" and "D" of FIG. 10.

Processing programs for executing a processing flow of FIG. 10, FIG. 11, and FIG. 4, that is, processing programs to be used for the arbitration control processing, are stored in the memories of the main actuator control ECU 6 and the sub actuator control ECU 11 in order to execute the arbitration control processing for the braking requests. FIG. 11 is a flowchart for illustrating processing continuing from "C" and "D" of FIG. 10 and "B" of FIG. 4. Moreover, processing of Steps S1, S2, and S8 of FIG. 10 and Step S5 of FIG. 11 is the same as the above-mentioned processing of Steps S1, S2, S5, and S8 of FIG. 3, and description thereof is thus omitted.

When the processing program makes a determination of "YES" in Step S2, the processing program proceeds to Step S21. In Step S21, the processing program determines whether or not the main communication line 5 is normal. When the processing program makes a determination of "YES" in Step S21, that is, determines that the main communication line 5 is normal, the processing program proceeds to Step S22. Meanwhile, when the processing program makes a determination of "NO" in Step S21, that is, determines that the main communication line 5 is not normal, the processing program proceeds to Step S23 through "D" of FIG. 10 and "D" of FIG. 11. In Step S22, the processing program determines whether or not the main automatic driving ECU 3 is normal. When the processing program makes a determination of "YES" in Step S21, that is, determines that the main automatic driving ECU 3 is normal, the processing program proceeds to Step S8. Meanwhile, when the processing program makes a determination of "NO" in Step S22, that is, determines that the main automatic driving ECU 3 is not normal, the processing program proceeds to Step S24.

Step S23 corresponds to a case in which the vehicle is in the automatic driving state, the main actuator 4 is normal, and the main communication line 5 is not normal. In this case, the processing program stops the control of the sub actuator 9, and achieves the braking request of the automatic driving with the use of the main actuator 4. The main actuator 4 is driven in accordance with the braking request (final braking request) output from the braking request arbitration control unit 8C of the sub automatic driving ECU 8. In this case, the driver braking request calculation unit 6B of the main actuator 4 (main actuator control ECU 6) and the braking request arbitration control unit 8C of the sub automatic driving ECU 8 are connected to each other through the brake communication I/F 6H, the brake communication line 12, the brake communication I/F 11E, the sub communication I/F 11A, the sub communication line 10, and the sub communication I/F 8B. Moreover, the braking request arbitration control unit 8C of the sub automatic driving ECU 8 is connected to the actuator control unit 6G through the sub communication I/F 8B, the sub communication line 10, the sub communication I/F 11A, the brake communication I/F 11E, the brake communication line 12, the brake communication I/F 6H, the main communication/GW determination unit 34, the main automatic driving ECU determination unit 6E, the automatic driving determination unit 6D, and the main actuator determination unit 6F.

Step S24 corresponds to a case in which the vehicle is in the automatic driving state, the main actuator 4 is normal, the main communication line 5 is normal, and the main automatic driving ECU 3 is not normal. In this case, the processing program stops the control of the sub actuator 9, and achieves the braking request of the automatic driving with the use of the main actuator 4. The main actuator 4 is driven in accordance with the braking request (final braking request) output from the braking request arbitration control unit 8C of the sub automatic driving ECU 8. In this case, the driver braking request calculation unit 6B of the main actuator 4 (main actuator control ECU 6) and the braking request arbitration control unit 8C of the sub automatic driving ECU 8 are connected to each other through the third path (the main communication I/F 6C, the main communication line 5, the main side connection line 32, the gateway 31, the sub side connection line 33, and the sub communication I/F 8B) and the main communication/GW determination unit 35. Moreover, the braking request arbitration control unit 8C of the sub automatic driving ECU 8 is connected to the actuator control unit 6G through the first path (the sub communication I/F 8B, the sub communication line 10, the sub side connection line 33, the gateway 31, the main side connection line 32, and the main communication I/F 6C), the main communication/GW determination unit 34, the main automatic driving ECU determination unit 6E, the automatic driving determination unit 6D, and the main actuator determination unit 6F.

As described above, in the third embodiment, the main communication line 5 and the sub communication line 10 are connected to each other through the gateway 31, and a basic action thereof is not particularly different from that in the first embodiment described above. In the third embodiment, as in the first embodiment, the same brake performance as that in the normal state can be continued even when an abnormality occurs in the main automatic driving ECU 3 or the main communication line 5.

In the first embodiment and the third embodiment, description has been given, as the example, of the case in which the braking force is applied to the vehicle with the use of the main actuator 4 when the main automatic driving ECU 3 or the main communication line 5 has failed under the automatic driving state. Moreover, in the second embodiment, description has been given, as the example, of the case in which the braking force is applied to the vehicle with the use of the sub actuator 9 when the main automatic driving ECU 3 or the main communication line 5 has failed under the automatic driving state. However, the configuration is not limited to those examples, and, for example, the braking force may be applied to the vehicle through both of the main actuator 4 and the sub actuator 9. That is, when the braking request is made through the operation of the brake pedal under the state in which the first vehicle control device has failed and the braking request has been made from the second vehicle control device, the arbitration unit can apply the braking force to the vehicle with the use of at least one of the first actuator and the second actuator based on the final braking request.

In each of the embodiments, description has been given, as the example, of the case in which the braking request arbitration control unit 8C serving as the arbitration unit is provided in the sub automatic driving ECU 8 serving as the second vehicle control device. However, the configuration is not limited to this example, and the arbitration unit may be provided in a device other than the second vehicle control device.

In each of the embodiments, description has been given, as the example, of the case in which the main actuator 4 serving as the first actuator is the electric booster device serving as the fluid pressure control device, and the sub actuator 9 serving as the second actuator is the electronic stability control (ESC) serving as the fluid amount control device. However, the configuration is not limited to this example, and, for example, the first actuator may be a fluid amount control device, and the second actuator may be a fluid pressure control device. Moreover, the first actuator and the second actuator may be fluid amount control devices. Further, the first actuator and the second actuator may be fluid pressure control devices. Still further, as the first actuator and the second actuator, there may be used actuators (brake actuators) other than the fluid pressure control devices (electric booster devices) or the electronic stability controls (ESCs), such as electric brake devices (electric caliper devices) each of which is configured to directly apply the braking force with the use of an electric motor without intermediation of the brake fluid.

Further, each of the embodiments is merely an example, and it is to be understood that the configurations described in different embodiments can be partially replaced or combined.

As the brake system according to the embodiments described above, for example, the following aspects are conceivable.

According to a first aspect of the present invention, there is provided a brake system including: a first vehicle control device; a first actuator configured to receive a braking request from the first vehicle control device or a braking request made through an operation of a brake pedal, and to apply a braking force to a vehicle; a second vehicle control device; a second actuator configured to receive a braking request from the second vehicle control device, and to apply a braking force to the vehicle; and an arbitration unit configured to generate a final braking request when the braking request is made through the operation of the brake pedal under a state in which the braking request from the second vehicle control device exists, wherein, when the braking request is made through the operation of the brake pedal under a state in which the first vehicle control device has failed and the braking request from the second vehicle control device exists, the arbitration unit is configured to cause at least one of the first actuator and the second actuator to apply the braking force to the vehicle based on the final braking request generated by acquiring, from the first actuator, the braking request made through the operation of the brake pedal.

According to the first aspect, when the first vehicle control device has failed, the arbitration unit causes at least one of the first actuator and the second actuator to apply the braking force to the vehicle based on the final braking request generated by acquiring, from the first actuator, the braking request made through the operation of the brake pedal. As a result, the same brake performance as that in the normal state can be continued even under the abnormal state.

According to a second aspect of the present invention, in the first aspect, the arbitration unit is configured to cause the first actuator to apply the braking force to the vehicle based on the final braking request. According to the second aspect, for example, even in the case in which the performance of the second actuator is lowered compared with the performance of the first actuator due to cost, the same brake performance as that in the normal state can be continued even under the abnormal state, that is, even when the first vehicle control device has failed.

According to a third aspect of the present invention, in the first aspect or the second aspect, the arbitration unit is provided in the second vehicle control device. According to the third aspect, the braking force can be applied to the vehicle based on the final braking request generated by the arbitration unit of the second vehicle control device. As a result, even under the abnormal state, that is, when the first vehicle control device has failed, the same brake performance as that in the normal state can be continued.

According to a fourth aspect of the present invention, in any one of the first to third aspects, the first actuator is a fluid pressure control device configured to control a pressure of fluid to be supplied to a wheel cylinder. According to the fourth aspect, the braking force can be applied to the vehicle with the use of the fluid pressure control device under the normal state and, as required, when the first vehicle control device has failed.

According to a fifth aspect of the present invention, in any one of the first to fourth aspects, the second actuator is a fluid amount control device configured to control an amount of fluid to be supplied to a wheel cylinder. According to the fifth aspect, the braking force can be applied to the vehicle with the use of the fluid amount control device under the normal state and, as required, when the first vehicle control device has failed.

According to a sixth aspect of the present invention, there is provided a brake system including: a first vehicle control device; a first actuator configured to receive a braking request from the first vehicle control device or a braking request made through an operation of a brake pedal, and to apply a braking force to a vehicle; a second vehicle control device; and a second actuator configured to receive a braking request from the second vehicle control device, and to apply a braking force to the vehicle, wherein, when the first vehicle control device has failed, the second vehicle control device is configured to acquire the braking request from the first actuator through the second actuator, and to cause the first actuator to apply the braking force.

According to the sixth aspect, when the first vehicle control device has failed, the second vehicle control device acquires the braking request from the first actuator through the second actuator, and causes the first actuator to apply the braking force. As a result, the same brake performance as that in the normal state can be continued even under the abnormal state. Moreover, for example, even in the case in which the performance of the second actuator is lowered compared with the performance of the first actuator due to cost, the same brake performance as that in the normal state can be continued under the abnormal state, that is, when the first vehicle control device has failed.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-013054 filed on Jan. 29, 2019. All disclosed contents including Specification, Scope of Claims, Drawings, and Abstract of Japanese Patent Application No. 2019-013054 filed on Jan. 29, 2019 are incorporated herein by reference in their entirety.

REFERENCE SIGNS LIST

2 brake pedal, 3 main automatic driving ECU (first vehicle control device). 4 main actuator (first actuator), 8 sub automatic driving ECU (second vehicle control device), 9 sub actuator (second actuator), 8C braking request arbitration control unit (arbitration unit)

The invention claimed is:

1. A brake system, comprising:
 a first vehicle control device;
 a first actuator configured to receive a braking request from the first vehicle control device or a braking request made through an operation of a brake pedal, and to apply a braking force to a vehicle;
 a second vehicle control device;
 a second actuator configured to receive a braking request from the second vehicle control device, and to apply a braking force to the vehicle; and
 an arbitration unit configured to generate a final braking request when the braking request is made through the operation of the brake pedal under a state in which the braking request from the second vehicle control device exists,
 wherein, when the braking request is made through the operation of the brake pedal under a state in which the first vehicle control device has failed and the braking request from the second vehicle control device exists, the arbitration unit is configured to cause at least one of the first actuator and the second actuator to apply the braking force to the vehicle based on the final braking request generated by acquiring, from the first actuator, the braking request made through the operation of the brake pedal.

2. The brake system according to claim 1, wherein the arbitration unit is configured to cause the first actuator to apply the braking force to the vehicle based on the final braking request.

3. The brake system according to claim 1, wherein the arbitration unit is provided in the second vehicle control device.

4. The brake system according to claim 1, wherein the first actuator is a fluid pressure control device configured to control a pressure of fluid to be supplied to a wheel cylinder.

5. The brake system according to claim 1, wherein the second actuator is a fluid amount control device configured to control an amount of fluid to be supplied to a wheel cylinder.

* * * * *